US012666150B2

(12) United States Patent
Jung et al.

(10) Patent No.: US 12,666,150 B2
(45) Date of Patent: Jun. 23, 2026

(54) ELECTRONIC DEVICE FOR PERFORMING IMAGE STABILIZATION AND OPERATION METHOD THEREOF

(71) Applicant: Samsung Electronics Co., Ltd., Suwon-si (KR)

(72) Inventors: Kioh Jung, Suwon-si (KR); Jiyeon Jo, Suwon-si (KR); Dongyoul Park, Suwon-si (KR); Jungpa Seo, Suwon-si (KR); Soonkyoung Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 18/738,558

(22) Filed: Jun. 10, 2024

(65) Prior Publication Data

US 2024/0334060 A1 Oct. 3, 2024

Related U.S. Application Data

(63) Continuation of application No. PCT/KR2023/002490, filed on Feb. 22, 2023.

(30) Foreign Application Priority Data

Mar. 8, 2022 (KR) ........................ 10-2022-0029248
Jun. 7, 2022 (KR) ........................ 10-2022-0069000

(51) Int. Cl.
*H04N 23/68* (2023.01)
(52) U.S. Cl.
CPC ....... *H04N 23/687* (2023.01); *H04N 23/6812* (2023.01)
(58) Field of Classification Search
CPC .. H04N 23/687; H04N 23/682; H04N 23/667; H04N 23/57; H04N 23/6812; G03B 30/00; H02K 41/0356

(Continued)

(56) References Cited

U.S. PATENT DOCUMENTS 9,232,138 B1 1/2016 Baldwin
2006/0245746 A1 11/2006 Makii
(Continued)

FOREIGN PATENT DOCUMENTS

JP 2008-40113 A 2/2008
JP 2010-11302 A 1/2010
(Continued)

OTHER PUBLICATIONS

International Search Report dated May 26, 2023, issued in International Patent Application No. PCT/KR2023/002490.
(Continued)

*Primary Examiner* — Xi Wang
(74) *Attorney, Agent, or Firm* — Jefferson IP Law, LLP

(57) ABSTRACT

According to an embodiment of the disclosure, an electronic device may include: a camera module including an optical image stabilization (OIS) driver which is shiftable within an OIS driving range; and at least one processor electrically connected with the camera module. The at least one processor may control the camera module to fix the OIS driver at a position that is biased away from a center of the OIS driving range in a first direction, may obtain image frames through the camera module while fixing the OIS driver, and may obtain a moving image by performing at least one of video digital image stabilization (VDIS) or electronic image stabilization (EIS) with respect to the image frames. Various other embodiments that are understood through the specification are possible.

16 Claims, 20 Drawing Sheets

(58) Field of Classification Search
USPC .......................................................... 348/374
See application file for complete search history.

(56) References Cited

U.S. PATENT DOCUMENTS

| | | | |
|---|---|---|---|
| 2008/0031605 A1 | 2/2008 | Akada et al. | |
| 2015/0187066 A1 | 7/2015 | Lau et al. | |
| 2016/0178922 A1* | 6/2016 | Hu ........................ G02B 27/646 | |
| | | | 359/557 |
| 2017/0038600 A1 | 2/2017 | Hee et al. | |
| 2017/0041545 A1 | 2/2017 | Murgia et al. | |
| 2017/0285364 A1 | 10/2017 | Isaka | |
| 2018/0348538 A1 | 12/2018 | Sugawara | |
| 2019/0191090 A1 | 6/2019 | Murashima et al. | |
| 2019/0260934 A1 | 8/2019 | Li et al. | |
| 2019/0387169 A1* | 12/2019 | Tan ........................ H04N 23/683 | |
| 2020/0007768 A1 | 1/2020 | Ohtsuka | |
| 2020/0137309 A1* | 4/2020 | Kulik ................. H04N 23/6812 | |
| 2020/0236251 A1 | 7/2020 | Topliss et al. | |
| 2020/0249425 A1 | 8/2020 | Hu et al. | |
| 2020/0389596 A1 | 12/2020 | Lee et al. | |
| 2020/0412954 A1 | 12/2020 | Gaizman et al. | |
| 2021/0218894 A1 | 7/2021 | Stec | |
| 2023/0362490 A1* | 11/2023 | Smyth ................ H02K 41/0354 | |

FOREIGN PATENT DOCUMENTS

| | | |
|---|---|---|
| KR | 10-2020-0139321 A | 12/2020 |
| KR | 10-2021-0013973 A | 2/2021 |

OTHER PUBLICATIONS

Extended European Search Report dated May 14, 2024, issued in European Patent Application No. 23712759.2.

European Office Action dated Sep. 11, 2025, issued in European Application No. 23712759.2.

\* cited by examiner

CAMERA MODULE (180)

FLASH (220)

LENS ASSEMBLY (210)

IMAGE SENSOR (230)

IMAGE STABILIZER (240)

IMAGE SIGNAL PROCESSOR (260)

MEMORY (250)

CAMERA MODULE (180)

x y

CAMERA MODULE (180)

AF GUIDE (1403)

CENTER OF
GRAVITY (1401)

STOPPER
SURACE (1015)

STOPPER
(1025)

X ← y

CAMERA MODULE (180)

1510

1520

1530

(1501)

CAMERA MODULE (180)

1540

(1503)

CAMERA MODULE (180)

(1601)

CAMERA MODULE (180)

(1603)

(1701)

(1703)

CAMERA MODULE (180)

(1901)

(1903)

ELECTRONIC DEVICE FOR PERFORMING IMAGE STABILIZATION AND OPERATION METHOD THEREOF

CROSS-REFERENCE TO RELATED APPLICATION(S)

This application is a continuation application, claiming priority under § 365 (c), of an International application No. PCT/KR2023/002490, filed on Feb. 22, 2023, which is based on and claims the benefit of a Korean patent application number 10-2022-0029248, filed on Mar. 8, 2022, in the Korean Intellectual Property Office, and of a Korean patent application number 10-2022-0069000, filed on Jun. 7, 2022, in the Korean Intellectual Property Office, the disclosure of each of which is incorporated by reference herein in its entirety.

TECHNICAL FIELD

The disclosure relates to a technology that performs image stabilization when shooting a video.

BACKGROUND ART

As the functions of mobile devices are diversified recently, the demand for enhancing the function of taking a photo or shooting a video by using mobile devices is increasing. Accordingly, technologies for compensating for shaking of an electronic device when a video is shot are developing.

An electronic device may include a camera module which is able to perform an optical image stabilization (OIS) function. The OIS function is a function that compensates for shaking by shifting an OIS driver (for example, a lens assembly or an image sensor) included in the camera module within an OIS driving range, and the camera module may shift the lens assembly or the image sensor in a direction to offset a movement of the electronic device in order to operate the OIS.

The electronic device may perform video digital image stabilization (VDIS) and/or electronic image stabilization (EIS) with respect to a plurality of image frames. The VDIS is a method for reducing shaking through digital processing in a mobile device, and a processor may correct the plurality of image frames through VDIS.

DISCLOSURE OF INVENTION

Technical Problem

Typically, an electronic device may use OIS and VDIS (and/or EIS) all together for the purpose of image stabilization, or may selectively any one of them. For example, when shooting a video under a specific condition (for example, a condition in which ambient illuminance of the electronic device is greater than or equal to a threshold value), the electronic device may stop operating OIS and may compensate for shaking of the video by using VDIS (and/or EIS). In this case, the electronic device may control an OIS driver to be positioned at the center of an OIS driving range, and may perform VDIS (and/or EIS) with respect to obtained image frames while the OIS driver is positioned at the center of the OIS driving range. However, when the electronic device shakes by a specific intensity or greater while stopping operating OIS (for example, while controlling the OIS driver to be positioned at the center of the OIS driving range), the OIS driver may be out of the center of the OSI driving range and there may be a problem that performance of VDIS (and/or EIS) is degraded.

Solution to Problem

According to an embodiment of the disclosure, an electronic device may include: a camera module including an optical image stabilization (OIS) driver which is shiftable within an OIS driving range; and at least one processor electrically connected with the camera module. The at least one processor may control the camera module to fix the OIS driver at a position that is biased away from a center of the OIS driving range in a first direction, may obtain image frames through the camera module while fixing the OIS driver, and may obtain a moving image by performing at least one of video digital image stabilization (VDIS) or electronic image stabilization (EIS) with respect to the image frames.

According to an embodiment of the disclosure, an operating method of an electronic device may include: controlling a camera module included in the electronic device to fix an OIS driver in the camera module at a position that is biased away from a center of an OIS driving range in a first direction; obtaining image frames through the camera module while fixing the OIS driver; and obtaining a moving image by performing at least one of VDIS or EIS with respect to the image frames.

According to an embodiment of the disclosure, an electronic device may include: a camera module; a sensor to detect a movement of the electronic device; and at least one processor electrically connected with the camera module and the sensor. The camera module may include: a lens assembly aligned with an optical axis; an OIS carrier configured to accommodate the lens assembly and to be shiftable in a direction parallel to the optical axis within an OIS driving range; and a housing to accommodate the lens assembly and the OIS carrier. The at least one processor may identify a direction of gravity exerted to the electronic device through the sensor, may control the camera module to fix the OIS carrier at a position that is biased away from a center of the OIS driving range in a first direction, the first direction being determined based on the direction of gravity, may obtain image frames through the camera module while fixing the OIS carrier and may obtain a moving image by performing at least one of video digital image stabilization (VDIS) or electronic image stabilization (EIS) with respect to the image frames.

Advantageous Effects of Invention

According to various embodiments of the disclosure, when an electronic device stops operating OIS and performs image stabilization by using VDIS (and/or EIS), a position of an OIS driver may be stably maintained even if the electronic device shakes by a predetermined intensity or greater. For example, the electronic device of the disclosure may reduce shaking by removing a vibration in a specific direction from shaking transmitted to the OIS driver. Accordingly, even when a video is shot with the electronic device shaking greatly, performance of image stabilization may be enhanced, and a moving image of enhanced quality may be obtained. Even when the electronic device trembles or shakes due to various impacts while a user is shooting a video through the electronic device, a shaking-compensated video may be obtained.

The effect achieved by the disclosure is not limited to those mentioned above, and other effects that are not mentioned above may be clearly understood to those skilled in the art based on the description provided below.

BRIEF DESCRIPTION OF DRAWINGS

Regarding descriptions of the drawings, the same or similar reference numerals may be used for the same or similar components.

BEST MODE FOR CARRYING OUT THE INVENTION

Hereinafter, various embodiments of the disclosure will be described with reference to the accompanying drawings. However, it should be appreciated that various embodiments are not intended to limit the disclosure to particular embodiments and include various modifications, equivalents, and/or alternatives of an embodiment of the disclosure.

Figure 1:
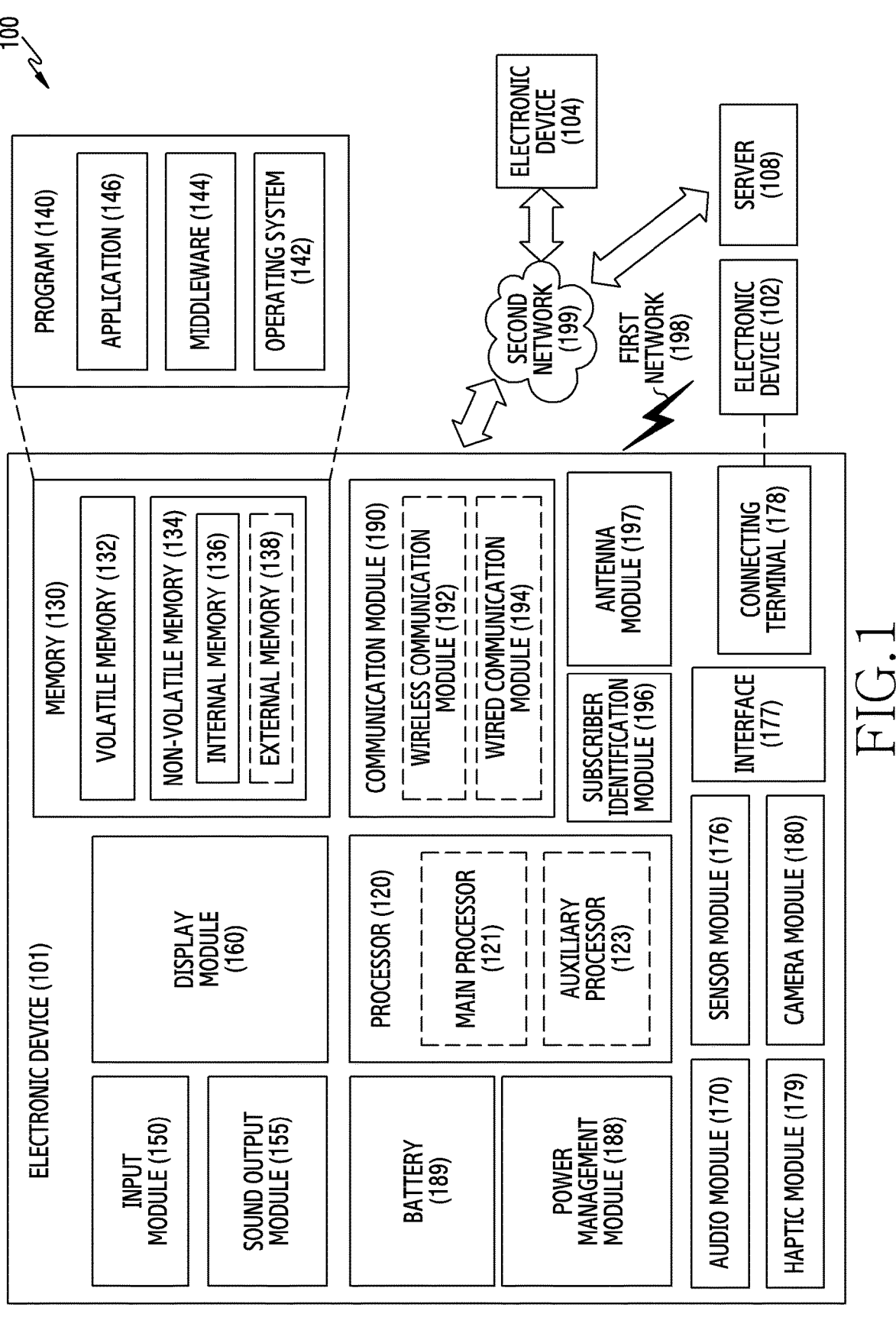
FIG. 1 is a block diagram of an electronic device in a network environment according to various embodiments.

FIG. 1 is a block diagram of an electronic device 101 in a network environment 100 according to various embodiments.

Referring to FIG. 1, the electronic device 101 in the network environment 100 may communicate with an electronic device 102 via a first network 198 (e.g., a short-range wireless communication network), or may communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module 196, or an antenna module 197. In some embodiments, at least one (e.g., the connection terminal 178) of the components may be omitted from the electronic device 101, or one or more other components may be added in the electronic device 101. In some embodiments, some of the components (for example, the sensor module 176, the camera module 180, or the antenna module 197) may be integrated into one component (for example, the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing device or an application processor), or an auxiliary processor 123 (e.g., a graphics processing device, a neural processing unit (NPU), an image signal processor, a sensor hub processor, or a communication processor) that is operable independently from, or in conjunction with, the main processor 121. For example, when the electronic device 101 includes the main processor 121 and the auxiliary processor 123, the auxiliary processor 123 may be set to consume lower power than the main processor 121, or to be specific to a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of other components (e.g., the camera module 180 or the communication module 190) functionally related to one another. According to an embodiment, the auxiliary processor 123 (e.g., the neural processing unit) may include a hardware structure that is specific to processing of an artificial intelligence (AI) model. The AI model may be created through machine learning. Such learning may be performed in the electronic device 101 itself, which performs the AI model, or may be performed through a separate server (for example, the server 108). A learning algorithm may include, for example, supervised learning, unsupervised learning, semi-supervised learning, or reinforcement learning, but is not limited to the above-described example. The AI model may include a plurality of AI neural network layers. The AI neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network or one of combinations of two or more of the aforementioned neural networks, but is not limited to the above-described example. The AI model may include a software structure additionally or alternatively, in addition to the hardware structure.

The memory 130 may store various data used by at least one component (e.g., the processor 120 or the sensor module 176) of the electronic device 101. The data may include, for example, software (e.g., the program 140) and input data or output data regarding a command related thereto. The memory 130 may include the volatile memory 132 or the non-volatile memory 134.

The program 140 may be stored in the memory 130 as software, and may include, for example, an operating system 142, middleware 144, or an application 146.

The input module 150 may receive a command or data to be used by a component (e.g., the processor 120) of the electronic device 101, from the outside (e.g., a user) of the electronic device 101. The input module 150 may include, for example, a microphone, a mouse, a keyboard, a key (for example, a button) or a digital pen (for example, a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding device. According to an embodiment, the display module 160 may include a touch sensor set to detect a touch, or a pressure sensor set to measure the intensity of force incurred by a touch.

The audio module 170 may convert a sound into an electrical signal or may convert an electrical signal into a sound reversely. According to an embodiment, the audio module 170 may obtain a sound via the input module 150, or output a sound via the sound output module 155 or an external electronic device (e.g., the electronic device 102) (e.g., a speaker or a headphone) directly or wirelessly coupled with the electronic device 101.

The sensor module 176 may detect an operational state (e.g., power or temperature) of the electronic device 101 or an environmental state (e.g., a state of a user) external to the electronic device, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support at least one specified protocol to be used for the electronic device 101 to be coupled with an external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with an external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via tactile sensation or kinesthetic sensation of the user. According to an embodiment, the haptic module 179 may include, for example, a motor, a piezoelectric element, or an electric stimulator.

The camera module 180 may capture a still image or a moving image. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishment of a direct (e.g., wired) communication channel or a wireless communication channel between the electronic device 101 and an external electronic device (e.g., the electronic device 102, the electronic device 104, or the server 108), and performance of communication via the established communication channel. The communication module 190 may include at least one communication processor that is operable independently from the processor 120 (e.g., an application processor) and supports direct (e.g., wired) communication or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be integrated into a single component (e.g., a single chip), or may be implemented as a plurality of components (e.g., a plurality of chips) separate from one another. The wireless communication module 192 may identify and authenticate the electronic device 1501 in a communication network, such as the first network 198 or the second network 199, using subscriber information (e.g., international mobile subscriber identity (IMSI)) stored in the subscriber identification module 196.

The wireless communication module 192 may support a 5G network beyond a 4G network, and a next-generation communication technology, for example, a new radio (NR) access technology. The NR access technology may support enhanced mobile broadband (eMBB), massive machine type communications (mMTC), or ultra-reliable and low latency communications (URLLC). For example, the wireless communication module 192 may support a high frequency band (for example, mm Wave band) to achieve a high data transmission rate. The wireless communication module 192 may support various technologies for guaranteeing performance in a high frequency band, for example, beamforming, massive multiple-input and multiple-output (MIMO), full dimensional MIMO (FD-MIMO), array antenna, analog beamforming, or large scale antenna. The wireless communication module 192 may support various requirements prescribed for the electronic device 101, an external electronic device (for example, the electronic device 104), or a network system (for example, the second network 199). According to an embodiment, the wireless communication module 192 may support a peak data rate (for example, 20 Gbps or more) for implementing eMBB, a loss coverage (for example, 164 dB or less) for implementing mMTC, or U-plane latency (for example, downlink (DL) and uplink (UL) of 0.5 ms or less, or round trip of 1 ms or less) for implementing URLLC.

The antenna module 197 may transmit or receive a signal or power to or from the outside (e.g., an external electronic device). According to an embodiment, the antenna module 197 may include an antenna including a radiator which is formed of a conductor or a conductive pattern formed on a substrate (for example, a PCB). According to an embodiment, the antenna module 197 may include a plurality of antennas (for example, an array antenna). In this case, at least one antenna appropriate for a communication scheme used in a communication network, such as the first network 198 or the second network 199, may be selected from the plurality of antennas by the communication module 190. A signal or power may be transmitted or received between the communication module 190 and an external electronic device via the selected at least one antenna. According to some embodiments, in addition to the radiator, other components (for example, a radio frequency integrated circuit (RFIC)) may be additionally formed as part of the antenna module 197.

According to various embodiments, the antenna module 197 may form an mmWave antenna module. According to an embodiment, the mmWave antenna module may include a printed circuit board, an RFIC which is disposed on a first surface (for example, a lower surface) of the printed circuit board or adjacent thereto, and supports a designated high frequency band (for example, mmWave band), and a plurality of antennas (for example, an array antenna) which are disposed on a second surface (for example, an upper surface or a side surface) of the printed circuit board or adjacent thereto, and transmit or receive a signal of the designated high frequency band.

At least some of the above-described components may be coupled to one another and may exchange signals (e.g., commands or data) with one another through an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled to the second network 199. The external electronic device 102, 104 may be a device of a same type as, or a different type, from the electronic device 101. According to an embodiment, all or some of operations to be executed at the electronic device 501 may be executed in one or more external electronic devices of the external electronic devices 102, 104, or 108. For example, if the electronic device 101 should perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To achieve this, cloud computing, distributed computing, mobile edge computing (MEC), or client-server computing technology may be used, for example. The electronic device 101 may provide an ultra-low latency service by using distributed computing or mobile edge computing, for example. In an embodiment, the external electronic device 104 may include an Internet of things (IoT) device. The server 108 may be an intelligent server that uses machine learning and/or a neural network. According to an embodiment, the external electronic device 104 or the server 108 may be included in the second network 199. The electronic device 101 may be applied to an intelligent service (for example, smart home, smart city, smart car, or health care) based on a 5G communication technology and an IoT-related technology.

The electronic device according to various embodiments of the disclosure may be various types of devices. The electronic device may include, for example, a portable communication device (for example, a smart phone), a computer device, a portable multimedia device, a portable medical device, a camera, a wearable device, or a home appliance. According to an embodiment of the disclosure, the electronic device is not limited to the above-described devices.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to refer to similar or related elements. It is to be understood that a singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include one or all possible combinations of the items enumerated together in a corresponding one of the phrases. As used herein, such terms as "1st" and "2nd," or "first" and "second" may be used to simply distinguish a corresponding component from another, and does not limit the components in other aspect (for example, importance or order). It is to be understood that if an element (for example, a first element) is referred to, with or without the term "operatively" or "communicatively", as "coupled with," "coupled to," "connected with," or "connected to" another element (for example, a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments of the disclosure may be implemented as software (for example, the program 140) including one or more instructions that are stored in a storage medium (for example, internal memory 136 or external memory 138) that is readable by a machine (for example, the electronic device 101). For example, a processor (for example, the processor 120) of the machine (for example, the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (for example, an electromagnetic wave), but this term does not differentiate between a case where data is semi-permanently stored in the storage medium and a case where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (for example, compact disc read only memory (CD-ROM)), or be distributed (for example, downloaded or uploaded) online via an application store (for example, Play Store™), or between two user devices (for example, smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (for example, a module or a program) of the above-described components may include a single entity or multiple entities, and some of the multiple entities may be separately disposed in other components. According to various embodiments, one or more of the above-described components or operations may be omitted, or one or more other components or operations may be added. Alternatively or additionally, a plurality of components (for example, modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
FIG. 2 is a block diagram illustrating a camera module according to various embodiments.
Figure 2:
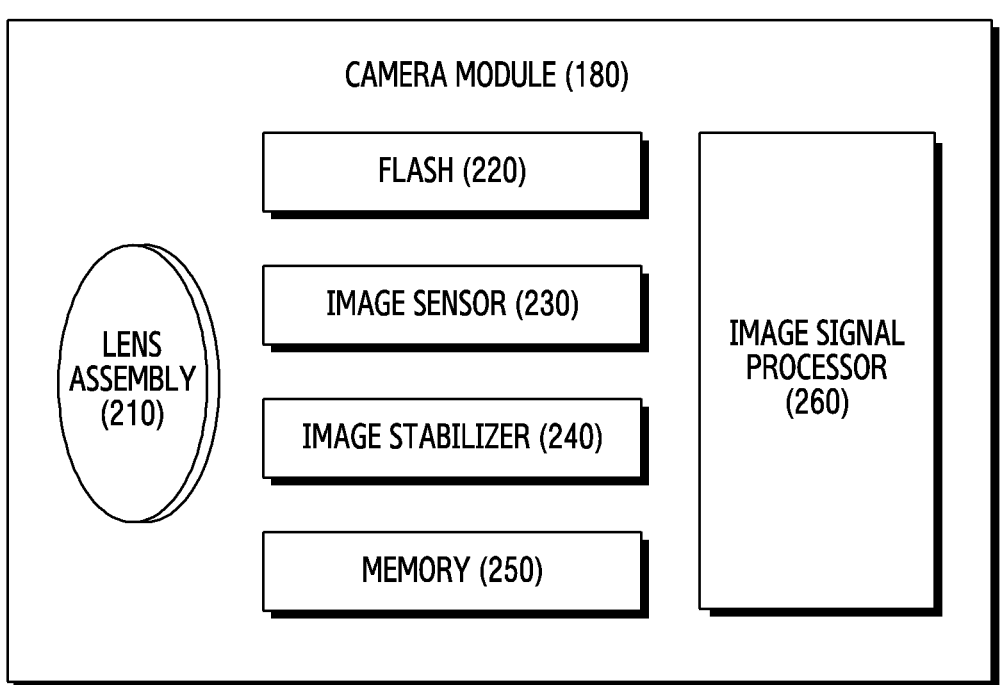

FIG. 2 is a block diagram 200 illustrating a camera module 180 according to various embodiments. Referring to FIG. 2, the camera module 180 may include a lens assembly 210, a flash 220, an image sensor 230, an image stabilizer 240, a memory 250 (for example, a buffer memory), or an image signal processor 260. The lens assembly 210 may collect light emitted from a subject which is a target object for capturing an image. The lens assembly 210 may include one or more lenses. According to an embodiment, the camera module 180 may include a plurality of lens assemblies 210. In this case, the camera module 180 may form, for example, a dual camera, a 360-degree camera, or a spherical camera. Some of the plurality of lens assemblies may have the same lens attribute (for example, a view angle, a focal distance, auto focusing, f number, or optical zoom), or at least one lens assembly may have one or more lens attributes different from lens attributes of other lens assemblies. The lens assembly 210 may include, for example, a wide angle lens or a telephoto lens.

The flash 220 may emit light which is used to reinforce the light emitted or reflected from the subject. According to an embodiment, the flash 220 may include one or more light emitting diodes (for example, red-green-blue (RGB) LED, white LED, infrared LED, or ultraviolet LED), or a xenon lamp. The image sensor 230 may obtain an image corresponding to the subject, by converting light emitted or reflected from the subject and transmitted through the lens assembly 210 into an electrical signal. According to an embodiment, the image sensor 230 may include, for example, one image sensor selected from image sensors having different attributes, such as an RGB sensor, a black and white (BW) sensor, an IR sensor, or a UV sensor, a plurality of image sensors having the same attribute, or a plurality of image sensors having different attributes. The respective image sensors included in the image sensor 230 may be implemented by using, for example, a charged coupled device (CCD) sensor or a complementary metal oxide semiconductor (CMOS) sensor.

The image stabilizer 240 may shift at least one lens included in the lens assembly 210, or the image sensor 230 in a specific direction, or may control operating characteristics of the image sensor 230 (for example, adjusting a read-out timing), in response to a movement of the camera module 180 or the electronic device 101 including the same. This may compensate for at least part of a negative influence on a captured image by the movement. According to an embodiment, the image stabilizer 240 may detect such a movement of the camera module 180 or the electronic device 101 by using a gyro sensor (not shown) or an acceleration sensor (not shown) disposed inside or outside the camera module 180. According to an embodiment, the image stabilizer 240 may be implemented by an optical image stabilizer, for example. The memory 250 may at least temporarily store at least part of an image obtained through the image sensor 230 for the next image processing operation. For example, when image acquisition is delayed due to a shutter or when a plurality of images are obtained at high speed, the obtained original image (for example, a Bayer-patterned image or an image of a high resolution) may be stored in the memory 250, and a copy image corresponding thereto (for example, an image of a low resolution) may be previewed through the display module 160. Thereafter, when a designated condition is satisfied (for example, a user input or a system command), at least part of the original image stored in the memory 250 may be obtained and processed by the image signal processor 260, for example. According to an embodiment, the memory 250 may be configured as at least part of the memory 230 or as a separate memory operated independently therefrom.

The image signal processor 260 may perform one or more image processing operations with respect to an image that is obtained through the image sensor 230 or an image that is stored in the memory 250. The one or more image processing operations may include, for example, depth map generation, 3-dimensional modeling, panorama generation, feature point extraction, image synthesis, or image compensation (for example, noise reduction, resolution adjustment, brightness adjustment, blurring, sharpening, or softening). Additionally or alternatively, the image signal processor 260 may perform control (for example, control of exposure time or control of read-out timing) for at least one (for example, the image sensor 230) of the components included in the camera module 180. An image processed by the image signal processor 260 may be stored in the memory 250 again or may be provided to an external component (for example, the memory 130, the display module 160, the electronic device 102, the electronic device 104, or the server 108) of the camera module 180 to be additionally processed. According to an embodiment, the image signal processor 260 may be configured as at least part of the processor 120 or may be configured as a separate processor operated independently from the processor 120. When the image signal processor 260 is configured as a separate processor from the processor 120, at least one image processed by the image signal processor 260 may be displayed through the display module 160 as it is by the processor 120 or after undergoing additional image processing.

According to an embodiment, the electronic device 101 may include a plurality of camera modules 180 having different attributes or functions. In this case, for example, at least one of the plurality of camera modules 180 may be a wide angle camera and at least one other camera module may be a telephoto lens camera. Similarly, at least one of the plurality of camera modules 180 may be a front-facing camera and at least one other camera module may be a rear-facing camera.

Figure 3:
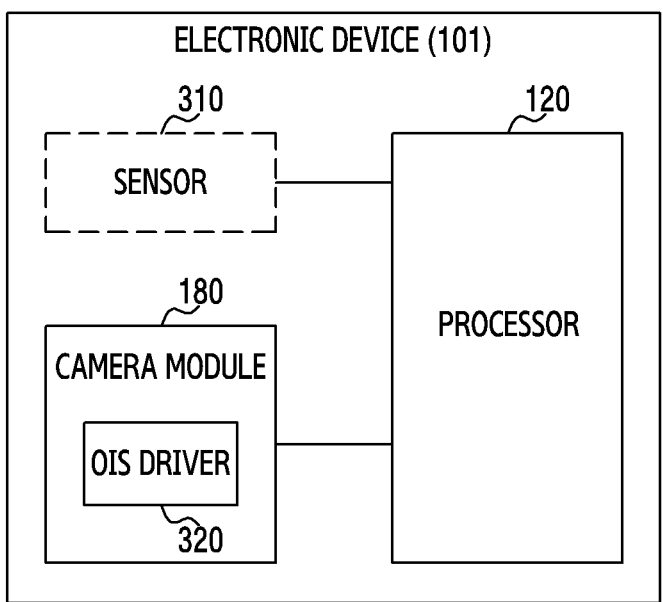
FIG. 3 is a block diagram illustrating a hardware configuration included in an electronic device according to an embodiment.

FIG. 3 is a block diagram illustrating a hardware configuration included in an electronic device according to an embodiment.

According to an embodiment, the electronic device 101 of FIG. 3 may correspond to the electronic device 101 of FIG. 1, a processor 120 of FIG. 3 may correspond to the processor 120 of FIG. 1, and a camera module 180 of FIG. 3 may correspond to the camera module 180 of FIGS. 1 and 2. In relation to FIG. 3, the components described in FIGS. 1 and 2 will be described briefly or a description thereof will be omitted.

According to an embodiment, the electronic device 101 may include a sensor 310. The sensor 310 of FIG. 3 may be included in the sensor module 176 of FIG. 1. According to an embodiment, the sensor 310 may detect a movement of the electronic device 101. The processor 120 may detect a movement of the electronic device 101 through the sensor 310, or may identify the direction of gravity exerted to the electronic device 101. For example, the sensor 310 may include at least one of an acceleration sensor or a gyro sensor.

According to an embodiment, the camera module 180 may include an optical image stabilization (OIS) driver 320. The camera module 180 (or the processor 120) may compensate for shaking of the electronic device 101 by shifting the OIS driver 320 within an OIS driving range.

According to an embodiment, the electronic device 101 may perform an OIS function for image stabilization. The OIS may include a lens shift method in which a lens assembly 210 is shifted in a direction substantially perpendicular to an optical axis, and a sensor shift method in which an image sensor 230 is shifted in a direction substantially perpendicular to an optical axis.

According to an embodiment, in the OIS of the lens shift method, the OIS driver 320 may include the lens assembly 210. For example, the camera module 180 may include a lens assembly 210 aligned with an optical axis and an OIS carrier which accommodates the lens assembly 210 and is shifted in a direction substantially perpendicular to the optical axis along with the lens assembly 210, and the processor 120 may perform the OIS function with the OIS carrier being shifted on a plane substantially perpendicular to the optical axis.

According to an embodiment, in the OIS of the sensor shift method, the OIS driver 320 may include the image sensor 230. For example, the image sensor 230 may be mounted in the camera module 180 to be able to be shifted, and the processor 120 may perform the OIS function according by shifting the image sensor 230 in a direction that offsets shaking of the electronic device 101.

The technical concept of the disclosure may be applied to all of an electronic device that uses OIS of the lens shift method, and an electronic device that uses OIS of the sensor shift method. In FIGS. 5 to 7 and FIGS. 9 to 14 of the disclosure, the technical concept of the disclosure will be described on the premise that the OIS of the lens shift method is used, and, in FIGS. 15 to 20, the technical concept of the disclosure will be described on the premise that the OIS of the sensor shift method is used. However, this is merely an example and the technical concept of the disclosure is not limited thereto.

In addition, technical features of the disclosure may be applied to a case in which the electronic device 101 includes two or more camera modules 180. According to an embodiment, the electronic device 101 may include two or more camera modules 180. For example, the electronic device 101 may include a first camera module including a telephoto lens, and a second camera module including a wide angle lens. For example, the electronic device 101 may include a first camera module including a telephoto lens, a second camera module including a wide angle lens, and a third camera module including an ultra-wide angle lens. According to an embodiment, at least some of the camera modules 180 included in the electronic device 101 may support the OIS function. According to an embodiment, at least some of the camera modules 180 included in the electronic device 101 may not support the OIS function. For example, the first camera module and the second camera module may support the OIS function, whereas the third camera module may not support the OIS function. In addition, according to an embodiment, when the electronic device 101 includes two or more camera modules 180, the electronic device 101 may include two or more OIS processing units to control respective OIS drivers 320. For example, the electronic device 101 may include a first camera module and a second camera module to support the OIS function, and a first OIS processing unit may control an OIS driver included in the first camera module and a second OIS processing unit may control an OIS driver included in the second camera module. According to an embodiment, when the electronic device 101 includes two or more camera modules 180, the electronic device 101 may include one OIS processing unit to control respective OIS drivers 320. For example, the electronic device 101 may include a first camera module and a second camera module to support the OIS function, and may control all of an OIS driver included in the first camera module and an OIS driver included in the second camera module through the single OIS processing unit. FIGS. 5 to 20 illustrates one camera module 180 included in the electronic device 101, but this is one example and does not limit the technical concept of the disclosure.

Figure 4:
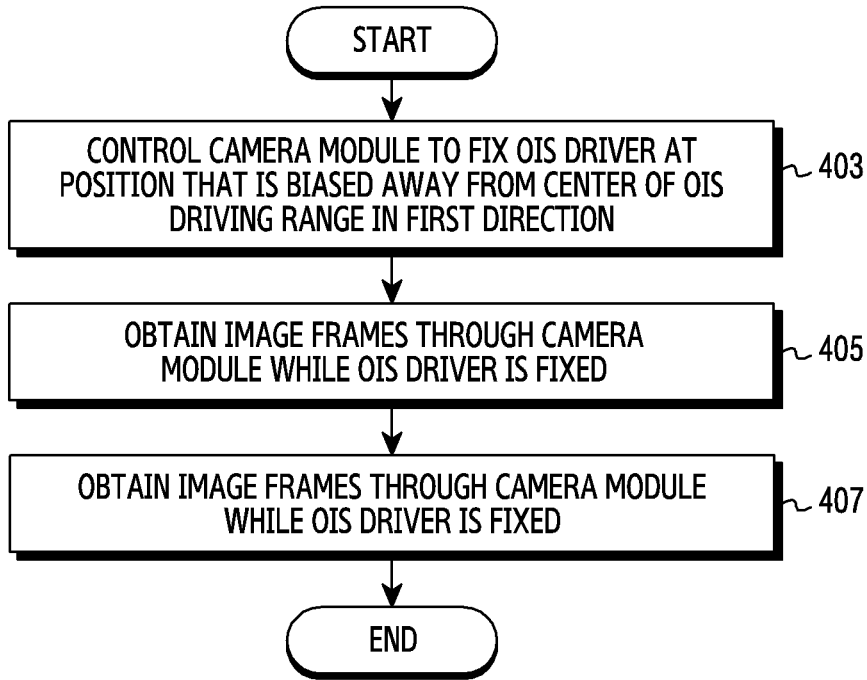
FIG. 4 is a flowchart illustrating a flow of operations of stopping operating OIS and obtaining a shaking-compensated moving image by using VDIS (and/or EIS) in an electronic device according to an embodiment.

FIG. 4 is a flowchart illustrating a flow of operations of stopping operating OIS and obtaining a shaking-compensated moving image by using a VDIS (and/or EIS) in an electronic device according to an embodiment. It may be understood that the operations illustrated in FIG. 4 are performed by the electronic device 101 or the processor 120 included in the electronic device 101.

According to an embodiment, before operation 403, the processor 120 may identify the direction of gravity exerted to the electronic device 101 through the sensor 310. For example, when the electronic device 101 is used by a user, gravity may be exerted in various directions. For example, when the user shoots a video by using the electronic device 101, the user may hold the electronic device 101 in portrait orientation or landscape orientation. The processor 120 may determine the direction of gravity exerted to the electronic device 101 according to a current state of the electronic device 101 by using the sensor 310. Examples of various directions exerted to the electronic device 101 will be described with reference to FIGS. 5 and 6.

According to an embodiment, in operation 403, the processor 120 may control the camera module 180 to fix the OIS driver 320 at a position that is biased away from a center of an OIS driving range in a first direction. The OIS driving range may indicate a range within which the OIS driver is shifted.

According to an embodiment, the processor 120 may determine the first direction based on the direction of gravity. According to an embodiment, the processor 120 may determine the first direction to be a direction parallel to the direction of gravity. According to an embodiment, the processor 120 may determine the first direction to be a direction that is at an angle of about 45 degrees with the direction of gravity. An example of the first direction will be described with reference to FIGS. 5 and 6.

According to an embodiment, the processor 120 may shift the OIS driver 320 in the first direction which is determined based on the direction of gravity, and may fix the OIS driver 320 to a corresponding position. For example, the processor 120 may fix the OIS driver 320 at a position where the OIS driver 320 is shifted to the maximum in the first direction within the OIS driving range. The position to which the OIS driver 320 is fixed will be described below with reference to FIGS. 5 and 6.

According to an embodiment, it has been explained that the first direction is determined based on the direction of gravity in relation to operation 403, but this is merely an example and various other embodiments are possible. For example, when a specific condition is satisfied, the processor 120 may control the camera module 180 to fix the OIS driver 320 in a specific direction (for example, the first direction).

According to an embodiment, in operation 405, the processor 120 may obtain image frames through the camera module 180 while fixing the OIS driver 320. The processor 120 may obtain image frames through the image sensor 230 while the OIS driver 320 is fixed.

According to an embodiment, in operation 407, the processor 120 may obtain a moving image by performing at least one of video digital image stabilization (VDIS) or electronic image stabilization (EIS) with respect to the image frames. For example, the processor 120 may stop operating OIS by fixing the OIS driver 320, and may compensate for shaking of the electronic device 101 by performing VDIS (and/or EIS) with respect to the image frames. The electronic device 101 may store a moving image file for which image stabilization is performed through VDIS (and/or EIS) in the memory 130.

According to an embodiment of the disclosure, in the mode in which the electronic device 101 stops operating OIS and performs image stabilization by using VDIS (and/or EIS), even when the electronic device 101 shakes by a predetermined intensity or greater, the position of the OIS driver 320 may be stably maintained. For example, when the OIS driver is fixed to a center of the OIS driving range in the OIS stopping mode and the electronic device shakes by a specific intensity or greater, the OIS driver may also move and performance of VDIS (and/or EIS) may be degraded. However, the electronic device 101 of the disclosure may physically support the OIS driver 320 by fixing the OIS driver 320 to an outer edge of the range in which the OIS driver 320 is movable. Accordingly, even when a video is shot while the electronic device 101 is greatly shaking, the OIS driver 320 may be fixed and the performance of VDIS (and/or EIS) may be enhanced and a moving image of enhanced quality may be obtained. Even when the electronic device 101 trembles or shakes due to various impacts while the user is shooting a video through the electronic device 101, a shaking-compensated moving image may be obtained.

Figure 5:
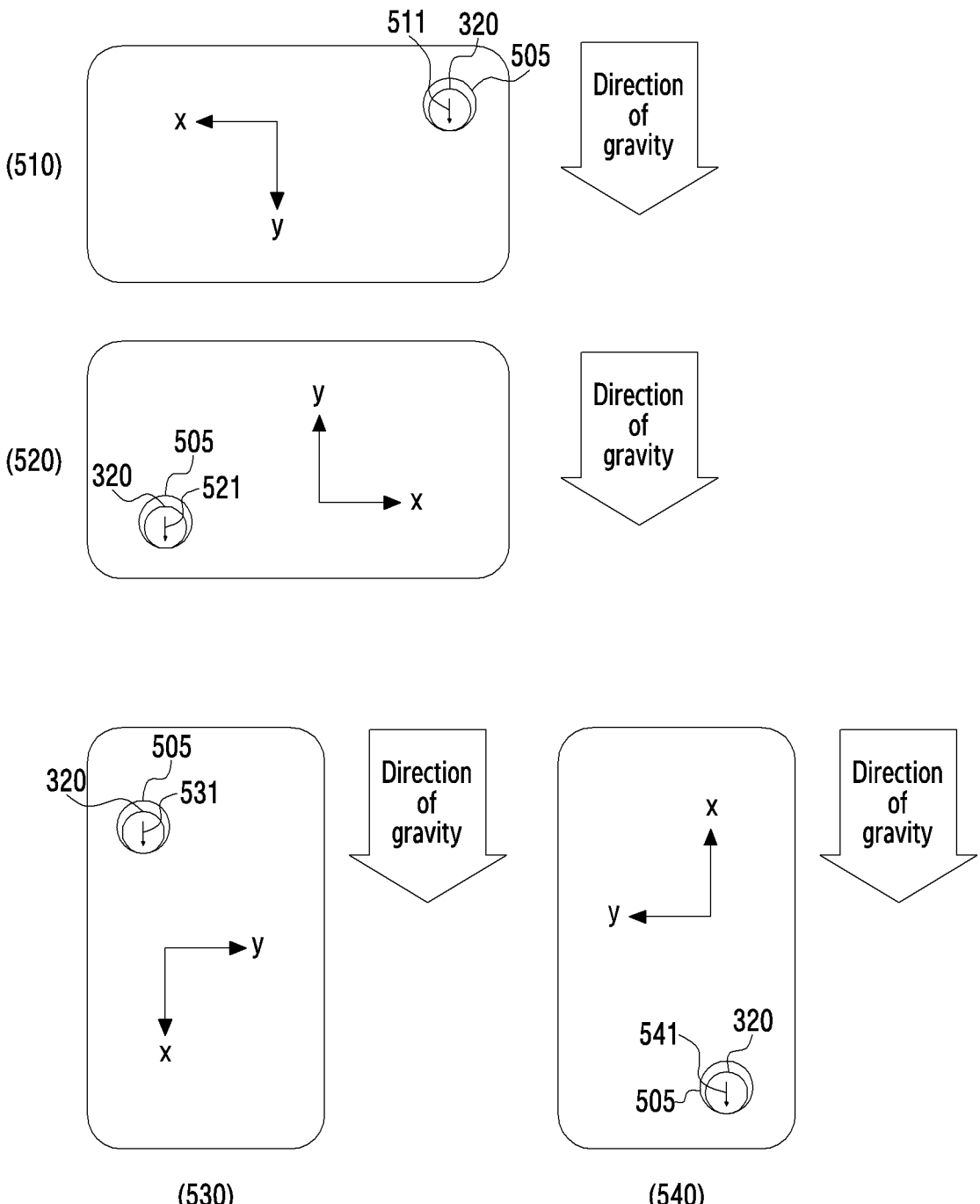
FIG. 5 is a view illustrating an example of a position to which an OIS driver is fixed in a camera module which supports OIS of a lens shift method according to an embodiment.

FIG. 5 illustrates an example of a position where an OIS driver is fixed in a camera module which supports OIS of a lens shift method according to an embodiment.

According to an embodiment, when shooting a video through the electronic device 101, a user may hold and use the electronic device 101 in orientations. For example, the user may hold the electronic device 101 as shown in an example of reference numeral 510 or 520 in order to shoot a video in a landscape mode. For example, the user may hold the electronic device 101 as shown in an example of reference numeral 530 or 540 in order to shoot a video in a portrait mode.

According to an embodiment, in the example of reference numeral 510, the processor 120 may identify that the direction of gravity exerted to the electronic device 101 is a +y-axis direction through the sensor 310. According to an embodiment, the processor 120 may determine that a first direction 511 is the +y-axis direction based on the direction of gravity. According to an embodiment, the processor 120 may control the OIS driver 320 (for example, the lens assembly 210) to be fixed at a position that is biased away from the center of an OIS driving range 505 in the first direction 511. For example, the processor 120 may fix the OIS driver 320 at a position where the OIS driver 320 is physically supported through an outer edge of the OIS driving range 505.

According to an embodiment, in the example of reference numeral 520, the processor 120 may identify that the direction of gravity exerted to the electronic device 101 is a −y-axis direction through the sensor 310. According to an embodiment, the processor 120 may determine that a first direction 521 is the −y-axis direction based on the direction of gravity. According to an embodiment, the processor 120 may control the OIS driver 320 (for example, the lens assembly 210) to be fixed at a position that is biased away from the center of the OIS driving range 505 in the first direction 521. For example, the processor 120 may fix the OIS driver 320 at a position where the OIS driver 320 is physically supported through an outer edge of the OIS driving range 505.

According to an embodiment, in the example of reference numeral 530, the processor 120 may identify that the direction of gravity exerted to the electronic device 101 is a +x-axis direction through the sensor 310. According to an embodiment, the processor 120 may determine that a first direction 531 is the +x-axis direction based on the direction of gravity. According to an embodiment, the processor 120 may control the OIS driver 320 (for example, the lens assembly 210) to be fixed at a position that is biased away from the center of the OIS driving range 505 in the first direction 531. For example, the processor 120 may fix the OIS driver 320 at a position where the OIS driver 320 is physically supported through an outer edge of the OIS driving range 505.

According to an embodiment, in the example of reference numeral 540, the processor 120 may identify that the direction of gravity exerted to the electronic device 101 is a −x-axis direction through the sensor 310. According to an embodiment, the processor 120 may determine that a first direction 541 is the −x-axis direction based on the direction of gravity. According to an embodiment, the processor 120 may control the OIS driver 320 (for example, the lens assembly 210) to be fixed at a position that is biased away from the center of the OIS driving range 505 in the first direction 541. For example, the processor 120 may fix the OIS driver 320 at a position where the OIS driver 320 is physically supported through an outer edge of the OIS driving range 505.

It is illustrated in FIG. 5 that the first direction 511, 521, 531, 541 is parallel to the direction of gravity, but this is merely an example and various embodiments are possible. For example, the first direction may not be parallel to the direction of gravity as shown in FIG. 6.

Figure 6:
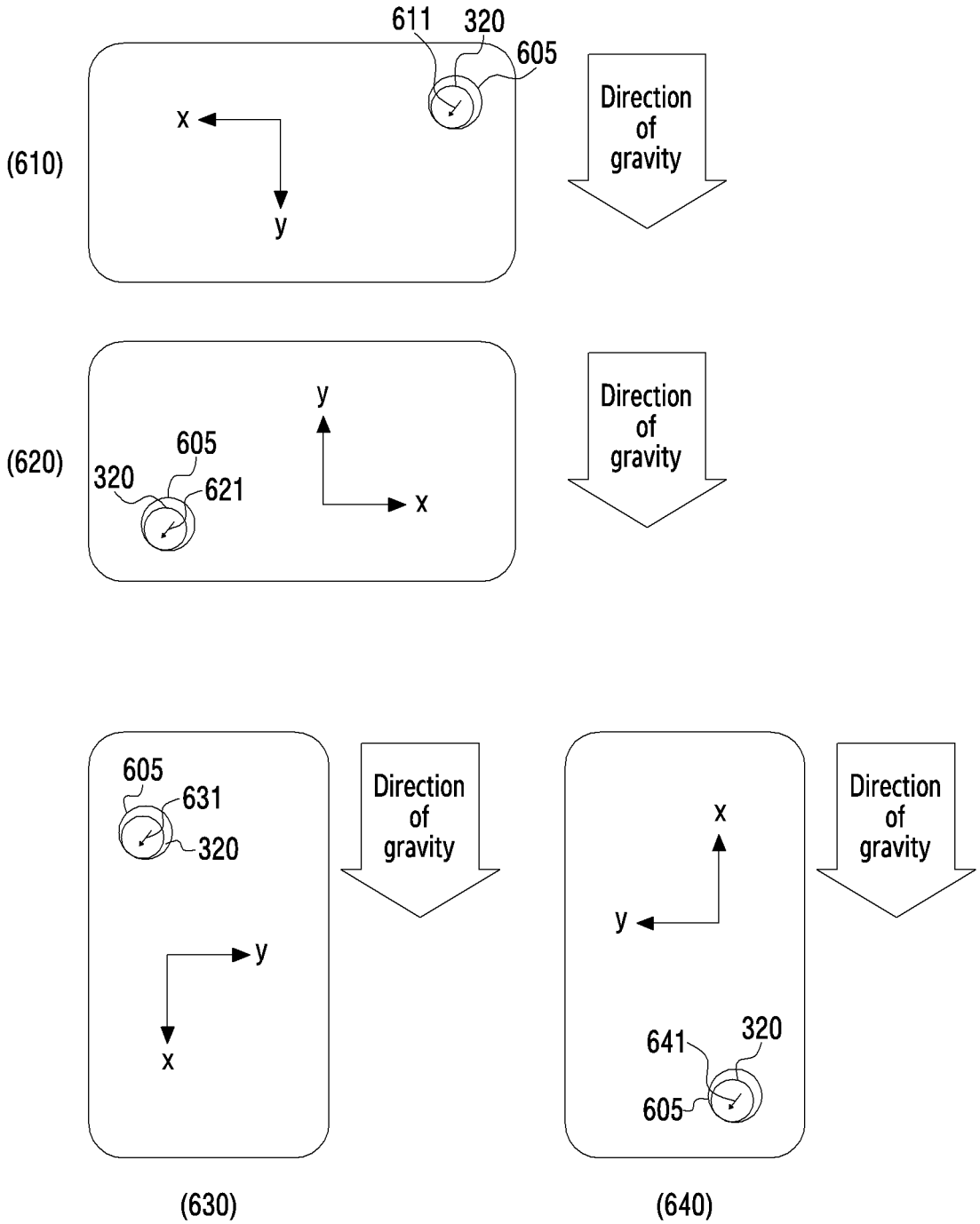
FIG. 6 is a view illustrating an example of a position to which an OIS driver is fixed in a camera module which supports OIS of a lens shift method according to an embodiment.

FIG. 6 illustrates an example of a position where an OIS driver is fixed in a camera module which supports OIS of a lens shift method according to an embodiment.

According to an embodiment, in the example of reference numeral 610, the processor 120 may identify that the direction of gravity exerted to the electronic device 101 is a +y-axis direction through the sensor 310. According to an embodiment, the processor 120 may determine that a first direction 611 is a (1, 1) direction based on the direction of gravity. According to an embodiment, the processor 120 may determine that the first direction 611 is a (−1, 1) direction based on the direction of gravity, which is different from that illustrated. That is, the processor 120 may determine that the first direction 611 is tilted at about 45 degrees from the direction of gravity. According to an embodiment, the processor 120 may control the OIS driver 320 (for example, the lens assembly 210) to be fixed at a position that is biased away from the center of an OIS driving range 605 in the first direction 611. For example, the processor 120 may fix the OIS driver 320 at a position where the OIS driver 320 is physically supported through an outer edge of the OSI driving range 605.

According to an embodiment, in the example of reference numeral 620, the processor 120 may identify that the direction of gravity exerted to the electronic device 101 is a −y-axis direction through the sensor 310. According to an embodiment, the processor 120 may determine that a first direction 621 is a (−1, −1) direction based on the direction of gravity. According to an embodiment, the processor 120 may determine that the first direction 621 is a (1, −1) direction based on the direction of gravity, which is different from that illustrated. That is, the processor 120 may determine that the first direction 621 is tilted at about 45 degrees from the direction of gravity. According to an embodiment, the processor 120 may control the OIS driver 320 (for example, the lens assembly 210) to be fixed at a position that is biased away from the center of the OIS driving range 605 in the first direction 621. For example, the processor 120 may fix the OIS driver 320 at a position where the OIS driver 320 is physically supported through an outer edge of the OSI driving range 605.

According to an embodiment, in the example of reference numeral 630, the processor 120 may identify that the direction of gravity exerted to the electronic device 101 is a +x-axis direction through the sensor 310. According to an embodiment, the processor 120 may determine that a first direction 631 is a (1, −1) direction based on the direction of gravity. According to an embodiment, the processor 120 may determine that the first direction 631 is a (1, 1) direction based on the direction of gravity, which is different from that illustrated. That is, the processor 120 may determine that the first direction 631 is tilted at about 45 degrees from the direction of gravity. According to an embodiment, the processor 120 may control the OIS driver 320 (for example, the lens assembly 210) to be fixed at a position that is biased away from the center of the OIS driving range 605 in the first direction 631. For example, the processor 120 may fix the OIS driver 320 at a position where the OIS driver 320 is physically supported through an outer edge of the OSI driving range 605.

According to an embodiment, in the example of reference numeral 640, the processor 120 may identify that the direction of gravity exerted to the electronic device 101 is a −x-axis direction through the sensor 310. According to an embodiment, the processor 120 may determine that a first direction 641 is a (−1, 1) direction based on the direction of gravity. According to an embodiment, the processor 120 may determine that the first direction 641 is a (−1, −1) direction based on the direction of gravity, which is different from that illustrated. That is, the processor 120 may determine that the first direction 641 is tilted at about 45 degrees from the direction of gravity. According to an embodiment, the processor 120 may control the OIS driver 320 (for example, the lens assembly 210) to be fixed at a position that is biased away from the center of an OIS driving range 605 in the first direction 641. For example, the processor 120 may fix the OIS driver 320 at a position where the OIS driver 320 is physically supported through an outer edge of the OSI driving range 605.

In other examples than the examples shown in FIGS. 5 and 6, the OIS driver 320 may be shifted in various direction within the OIS driving range 505, 605 and may be fixed. For example, the first direction may be determined to be tilted at about 30 degrees from the direction of gravity, or may be determined to be tilted at about 60 degrees from the direction of the gravity. However, in the disclosure, the OIS driver 320 may be fixed to be supported by an outer edge of the OIS driving range and to be less influenced by shaking of the electronic device 101. Therefore, the first direction may not be determined to be oriented in the opposite direction of the direction of gravity. Although it is illustrated in FIGS. 5 and 6 that the first direction is determined based on the direction of gravity, the first direction may be determined based on various other conditions.

It is illustrated in FIGS. 5 and 6 that the lens assembly 210 is fixed at a position that is biased away from the center of the OIS driving range in the first direction in the electronic device 101 which supports the OIS of the lens shift method. However, in the electronic device 101 supporting OIS of a sensor shift method, the camera module 180 may be controlled to cause the image sensor 230 to be fixed at a position that is biased away from the center of the OIS driving range in the first direction described in FIGS. 5 and 6.

Figure 7:
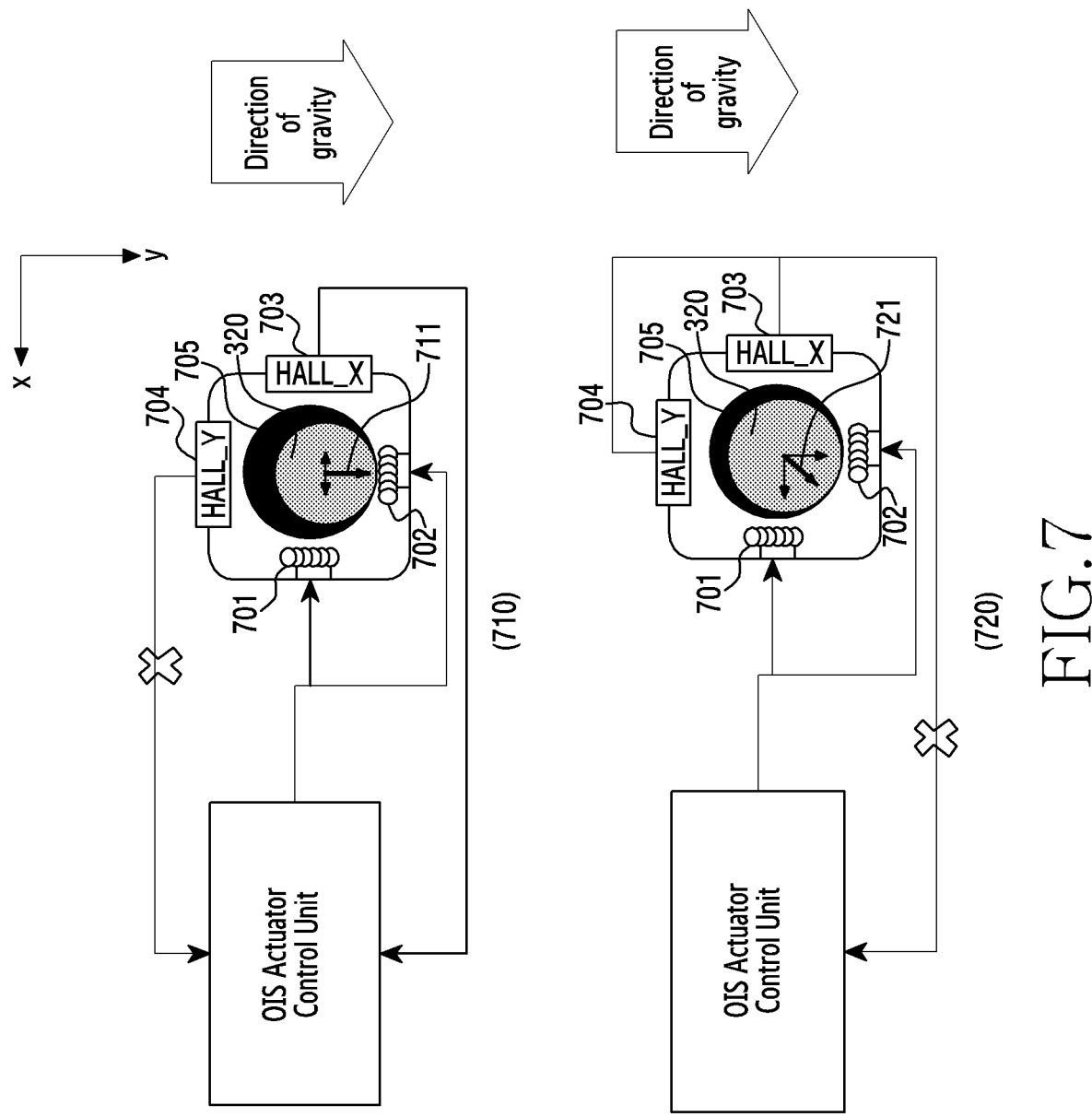
FIG. 7 is a view illustrating an example of a method of controlling a current applied to an OIS coil in an electronic device which supports OIS of a lens shift method according to an embodiment.

FIG. 7 illustrates an example of a method of controlling a current applied to an OIS coil in an electronic device which supports OIS of a lens shift method according to an embodiment. In FIG. 7, the method will be described based on the electronic device 101 using the OIS of the lens shift method, but the technical concept of the disclosure may be applied to the electronic device 101 using OIS of a sensor shift method. In descriptions regarding FIG. 7, an OIS driver 320 may refer to a lens assembly 210 or an OIS carrier (not shown) accommodating the lens assembly 210.

According to an embodiment, the method described in FIG. 7 may be used to fix the OIS driver 320 at a predetermined position within the OIS driving range 505, 605 as described in FIGS. 5 and 6. However, the method of FIG. 7 will be described on the premise that a voice coil motor (VCM) is used, but this is merely an example. The technical concept of the disclosure described in FIGS. 4 to 6 may be applied to a camera module that uses motors of other methods. For example, the contents of the disclosure may be applied to a camera module of a wire type. In addition, even in the camera module of the VCM method, shapes of a magnet and a coil (for example, a first OIS coil 701, a second OIS coil 702) and/or an operating method of the OIS driver 320 may be different from the contents described in FIG. 7 according to a type of electromagnetic force (for example, Lorentz force, solenoid).

According to an embodiment, the camera module 180 may include an OIS driver 320 which is shiftable within an OIS driving range 705, a housing which accommodates the OIS driver 320, a first OIS magnet (not shown) which is fixed to a first side surface (for example, an outside surface in a +x direction) of the OIS driver 320, a second OIS magnet (not shown) which is fixed to a second side surface (for example, an outside surface in a +y direction) of the OIS driver 320, a first OIS coil 701 which is fixed to a first inner surface of the housing to face the first OIS magnet, and a second OIS coil 702 which is fixed to a second inner surface of the housing to face the second OIS magnet. In addition, the camera module 180 may include a first position sensor 703 which is disposed on the first inner surface of the housing or a surface facing the first inner surface, and a second position sensor 704 which is disposed on the second inner surface of the housing or a surface facing the second inner surface. The first position sensor 703 and the second position sensor 704 may be hall sensors. It is illustrated in FIG. 7 that the OIS coil 701 and the first position sensor 703, and the second OIS coil 702 and the second position sensor 704 are disposed on surfaces facing each other, but this is for convenience of explanation and does not limit structural features of the camera module 180 of the disclosure. For example, the first position sensor 703 may be disposed on the first inner surface of the housing along with the first OIS coil 701, and the second position sensor 704 may be disposed on the second inner surface of the housing along with the second OIS coil 702. For example, the first position sensor 703 may be disposed in an inner hole of the first OIS coil 701 to be enclosed by the first OIS coil 701. The second position sensor 704 may be disposed in an inner hole of the second OIS coil 702 to be enclosed by the second OIS coil 702. For example, the first position sensor 703 may not be disposed to be enclosed by the first OIS coil 701, but may be disposed on the same surface as the first OIS coil 701. The second position sensor 704 may not be disposed to be enclosed by the second OIS coil 702, but may be disposed on the same surface as the second OIS coil 802.

According to an embodiment, the processor 120 may control a current applied to the first OIS coil 701 to shift the OIS driver 320 in the x-axis direction, and may control a current applied to the second OIS coil 702 to shift the OIS driver 320 in the y-axis direction in order to perform an OIS function. In addition, in an embodiment of the disclosure, the processor 120 may control a current applied to the first OIS coil 701 to fix the OIS driver 320 in the +x-axis or −x-axis direction, and may control a current applied to the second OIS coil 702 to fix the OIS driver 320 in the +y axis or −y-axis direction in order to stop operating OIS. According to an embodiment, the processor 120 may identify a position of the OIS driver 320 on a first axis (for example, the x-axis) by using the first position sensor 703, and may identify a position of the OIS driver 320 on a second axis (for example, the y-axis) by using the second position sensor 704. However, the above-described example has been described on the premise that OIS control of a solenoid method is used, and, when a camera module controlling OIS in a Lorenz method is used, a current applied to the first OIS coil 701 may be controlled, such that a position of the OIS driver 320 on the second axis (for example, the y-axis) may be determined (shifted or fixed), and the position of the OIS driver 320 on the second axis (for example, the y-axis) may be identified through the second position sensor 704.

According to an embodiment, the processor 120 may identify the direction of gravity exerted to the electronic device 101, and a degree of movement of the electronic device 101 through the sensor 310. For example, the processor may determine an intensity of shaking of the electronic device 101. According to an embodiment, as shown in the examples of reference numeral 710 and reference numeral 720, the processor 120 may determine that the direction of gravity exerted to the electronic device 101 is the +y-axis direction.

According to an embodiment, in the example of reference numeral 710, the processor 120 (for example, an OIS actuator control circuit) may control a current applied to the second OIS coil 702 to fix the OIS driver 320 at a position that is biased away from the center of the OIS driving range 705 in the +y-axis direction. According to an embodiment, the processor 120 may control an intensity of a current applied to the second OIS coil 702, based on a degree of movement of the electronic device 101, without using a result of identifying by the second position sensor 704. For example, the processor 120 may increase a current to be applied to the second OIS coil 702 as the electronic device 101 shakes much. That is, the processor 120 may control an OIS actuator of the y-axis direction (for example, the second OIS coil 702, the second position sensor 704) in an open loop method.

According to an embodiment, in the example of reference numeral 710, the processor 120 may control a current applied to the first OIS coil 701 to control the OIS driver 320 to be positioned at a center on the x-axis. According to an embodiment, the processor 120 may control the position of the OIS driver 320 on the x-axis to be maintained close to the center by using a result of identifying by the first position sensor 703. That is, the processor 120 may control an OIS actuator of the x-axis direction (for example, the first OIS coil 701, the first position sensor 703) in a close loop method.

According to an embodiment, in the example of reference numeral 701, a first direction 711 in which the OIS driver 320 is fixed may be substantially parallel to the direction of gravity. For example, in the example of reference numeral 710, the first direction 711 may be the +y-axis direction.

According to an embodiment, in the example of reference numeral 720, the processor 120 (for example, an OIS actuator control circuit) may control a current applied to the second OIS coil 702 to control the second OIS coil 702 to attract the OIS driver 320 in the +y-axis direction. According to an embodiment, the processor 120 may control an intensity of a current applied to the second OIS coil 702, based on a degree of movement of the electronic device 101, without using a result of identifying by the second position sensor 704. For example, the processor 120 may increase a current to be applied to the second OIS coil 702 as the electronic device 101 shakes much. That is, the processor 120 may control an OIS actuator of the y-axis direction (for example, the second OIS coil 702, the second position sensor 704) in the open loop method.

According to an embodiment, in the example of reference numeral 720, the processor 120 (for example, an OIS actuator control circuit) may control a current applied to the first OIS coil 701 to control the first OIS coil 701 to attract the OIS driver 320 in the +x-axis direction. According to an embodiment, the processor 120 may control an intensity of a current applied to the first OIS coil 701, based on a degree of movement of the electronic device 101, without using a result of identifying by the first position sensor 703. For example, the processor 120 may increase a current to be applied to the first OIS coil 701 as the electronic device 101 shakes much. That is, the processor 120 may also control an OIS actuator of the x-axis direction (for example, the first OIS coil 701, the first position sensor 703) in the open loop method.

According to an embodiment, in the example of reference numeral 720, a first direction 721 in which the OIS driver 320 is fixed may be a direction that is tilted at about 45 degrees from the direction of gravity. For example, the first direction 721 in the example of reference numeral 720 may be a (1, 1) direction.

According to an embodiment, it is illustrated in the example of reference numeral 720 that the processor 120 controls either the first OIS coil 701 or the second OIS coil 702 to attract the OIS driver 320, but this is merely an example. The first OIS coil 701 may be controlled to repel the OIS driver 320. That is, in the example of reference numeral 720, the first direction 721 may be a (−1, 1) direction besides the (1, 1) direction.

Referring to the examples of reference numeral 710 and reference numeral 720 of FIG. 7, the first direction in which the OIS driver 320 is fixed may vary according to whether any one of the OIS actuator of the x-axis direction and the OIS actuator of the y-axis direction is operated in the open loop method or both of them are operated in the open loop form. Comparing the examples of reference numeral 710 and reference numeral 720, power consumption may be reduced in the case of reference numeral 710 in which only the OIS actuator of the y-axis is controlled in the open loop method, and a fixing force of the OIS driver 320 may be reinforced in the case of reference numeral 720 in which all of the OIS actuators of the x-axis direction and the y-axis direction are controlled in the open loop method.

Figure 8:
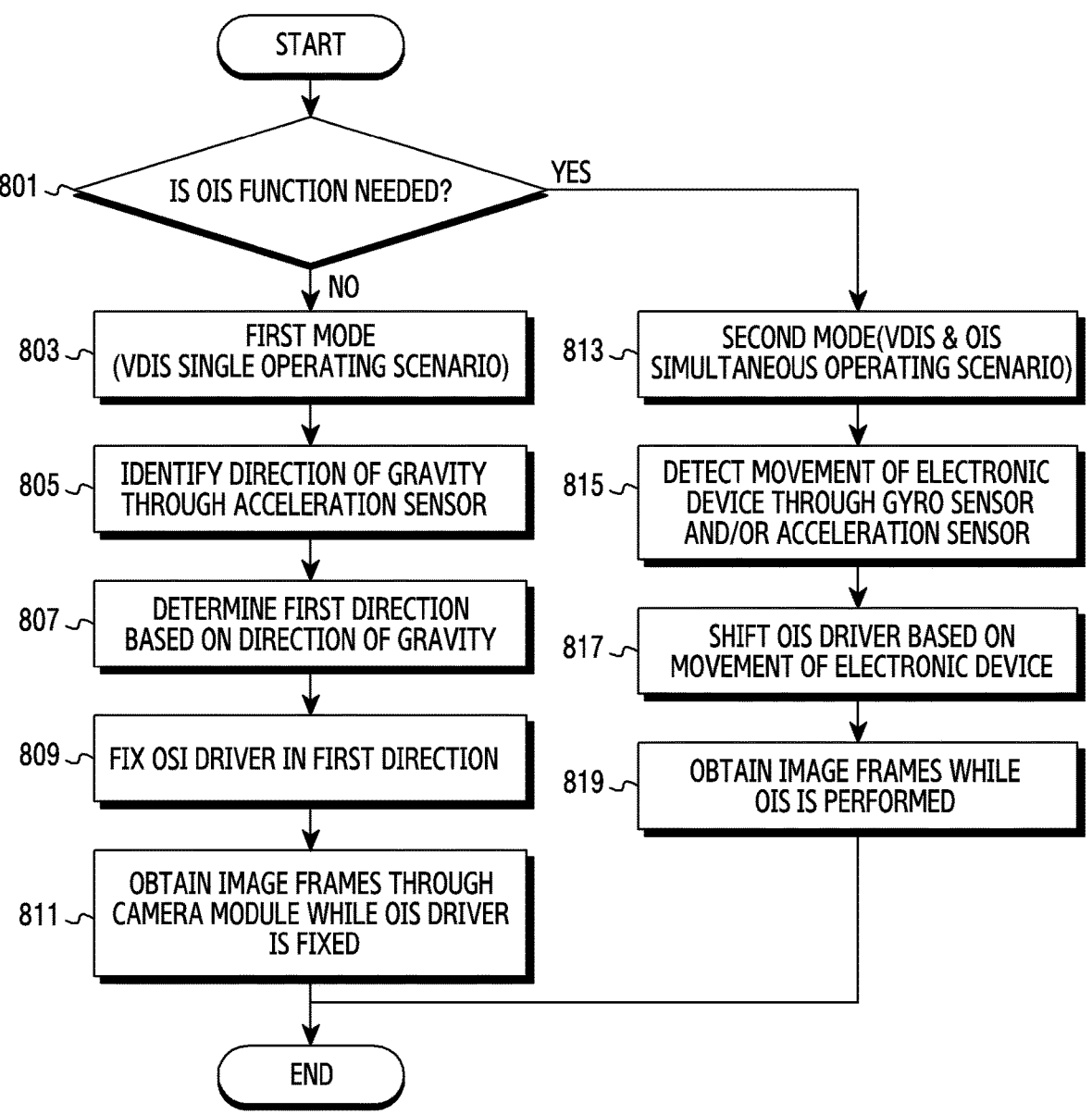
FIG. 8 is a view illustrating an example of an operation according to a moving image shooting mode in an electronic device according to an embodiment.

FIG. 8 illustrates an example of operations performed according to a video shooting mode in an electronic device according to an embodiment. The operations of FIG. 8 may be understood as being performed by the electronic device 101 or the processor 120, and the processor 120 may be understood as including at least one of a VDIS/EIS processor unit, an OIS processor unit, or an OIS actuator control circuit.

According to an embodiment, in operation 801, the processor 120 (for example, the VDIS/EIS processor unit) may determine whether an OIS function is needed. For example, the processor 120 may determine the presence of a VDIS (and/or EIS) single operating scenario. In the disclosure, the VDIS (and/or EIS) single operating scenario may correspond to a first mode of video shooting modes, and a VDIS (and/or EIS) and OIS simultaneous operating scenario may correspond to a second mode among video shooting modes. The first mode may be a mode in which the OIS driver 320 is fixed and shaking of a moving image is compensate for by performing VDIS (and/or EIS), and the second mode may be a mode in which the OIS driver 320 is shifted and shaking of the electronic device 101 is offset, and also, shaking of a moving image is compensated for by performing VDIS (and/or EIS).

According to an embodiment, the processor 120 may determine the video shooting mode to the first mode or the second mode according to whether the OIS function is needed. According to an embodiment, when ambient illuminance of the electronic device 101 is greater than or equal to a threshold value as a result of measuring by an illuminance sensor, the processor 120 may determine the video shooting mode to the first mode. When the ambient illuminance of the electronic device 101 is greater than or equal to the threshold value, it is possible to obtain image frames through short exposure, and accordingly, even when the OIS is stopped, a stabilized mage frame may be captured. Accordingly, the electronic device 101 may determine a shooting mode of the electronic device 101 based on ambient illuminance of the electronic device 101. In addition, the video shooting mode may be determined based on various criteria.

According to an embodiment, in operation 803, when the processor 120 determines that the OIS function is not needed, the processor 120 may determine to shoot a video in the first mode. When the processor 120 determines the VDIS (and/or EIS) single operating scenario, that is, the first mode, the processor 120 may fix the OIS driver 320. Fixing of the OIS driver may correspond to contents described in FIGS. 5 to 7.

According to an embodiment, in operation 805, the processor 120 may identify the direction of gravity exerted to the electronic device 101 by using an acceleration sensor. According to an embodiment, in operation 807, the processor 120 (for example, the OIS processor unit) may determine a first direction for fixing the OIS driver 320 based on the direction of gravity obtained through the acceleration sensor.

According to an embodiment, in operation 809, the processor 120 may fix the OIS driver 320 in the first direction. For example, the processor 120 (for example, the OIS actuator control circuit) may control a current applied to the first OIS coil 701 and/or the second OIS coil 702 to fix the OIS driver 320 in the first direction which is calculated in the OIS processor unit. In this case, the processor 120 may control the OIS actuator of the x-axis direction in the close loop method, and may control the OIS actuator of the y-axis direction in the open loop method as described in the example of reference numeral 710 of FIG. 7. In addition, the processor 120 may control both the OIS actuator of the x-axis direction and the OIS actuator of the y-axis direction in the open loop method as described in the example of reference numeral 720.

According to an embodiment, in operation 811, the processor 120 may obtain image frames through the camera module 180 while fixing the OIS driver 320.

According to an embodiment, in operation 813, when it is determined the OIS function is needed, the processor 120 may determine to shoot a video in the second mode. When the VDIS (and/or EIS) and OIS simultaneous operating scenario, that is, the second mode, is determined, the processor 120 (for example, the VDIS/EIS processor unit) may activate the OIS function.

According to an embodiment, in operation 815, the processor 120 (for example, the OIS processor unit) may detect a movement of the electronic device 101 through a gyro sensor and/or an acceleration sensor. According to an embodiment, in operation 817, the processor 120 may shift the OIS driver 320 based on the movement of the electronic device 101. For example, the processor 120 may determine a position or a shift of the OIS driver 320, based on the movement detected in operation 815. For example, the processor 120 may determine that the OIS driver 320 should be shifted in a direction that offsets shaking of the electronic device 101. According to an embodiment, the processor 120 (for example, the OIS actuator control circuit) may control a current applied to the first OIS coil 701 and/or the second OIS coil 702, based on a result obtained from the OIS processor unit. According to an embodiment, the processor 120 may control both the OIS actuator of the x-axis direction and the actuator of the y-axis direction in the close loop method in the second mode.

According to an embodiment, in operation 819, the processor 120 may obtain image frames while performing the OIS.

Figure 9:
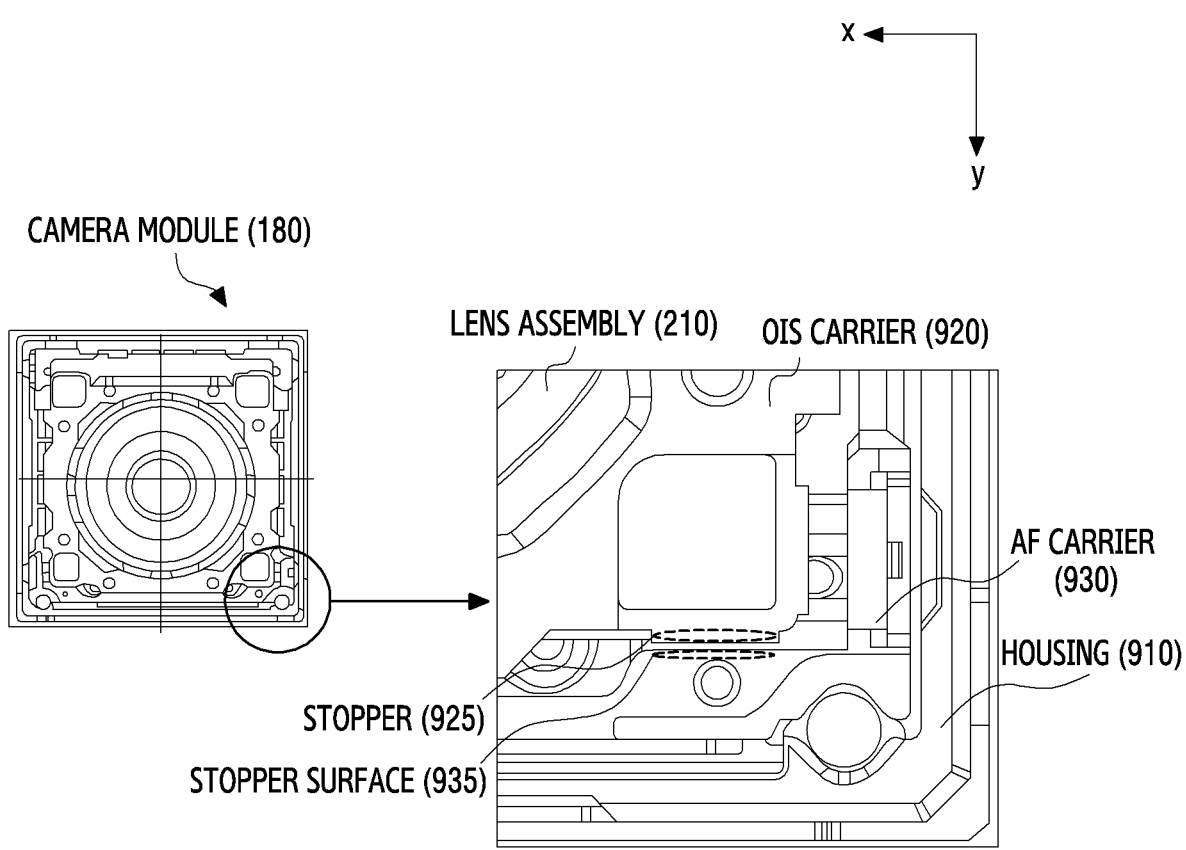
FIG. 9 is a view illustrating examples of a stopper and a stopper surface included in a camera module which supports OIS of a lens shift method according to an embodiment.

FIG. 9 illustrating examples of a stopper and a stopper surface which are included in a camera module supporting OIS of a lens shift method according to an embodiment. In FIGS. 9 to 14, an example of an additional structure for further enhancing a fixing force of the OIS driver 320 in the electronic device 101 supporting the OIS of the lens shift method is illustrated.

Referring to FIG. 9, a camera module 180 may include a lens assembly 210, an OIS carrier 920 which shifts the lens assembly 210 in a direction substantially perpendicular to an optical axis, an AF carrier 930 which accommodates the OIS carrier 920 and shift the lens assembly 210 in a direction substantially parallel to the optical axis, and a housing 910 which accommodates the AF carrier 930 and forms an exterior of the camera module 180.

According to an embodiment, a stopper 925 may be formed on a part of an outside surface of the OIS carrier 920, and a stopper surface 935 may be formed on a part of an inner surface of the AF carrier 930. The stopper surface 935 may be formed on an area of the inner surface of the AF carrier 930 that may come into contact with the stopper 925.

According to an embodiment, the stopper surface 935 formed on the AF carrier 930 may be formed with a material that has a high friction compared to other inner surfaces of the AF carrier 930. For example, the stopper surface 935 may be at least one of an injection etching surface, a double injection surface (for example, rubber), or a coating surface.

According to an embodiment, when the processor 120 fixes the OIS driver 320 (for example, the lens assembly 210 and/or the OIS carrier 920) in a first direction (for example, a +y direction, the stopper 925 may come into contact with the stopper surface 935 of the AF carrier 930. When the stopper 925 and the stopper surface 935 come into contact with each other, shaking of the OIS driver 320 (for example, the OIS carrier 920) may be reduced due to the contact between the stopper 925 and the stopper surface 935. According to the structure illustrated in FIG. 9, when the direction of gravity is the +y direction, shaking of the OIS carrier 920 may be reduced only by self-load, self-weight.

Figure 10:
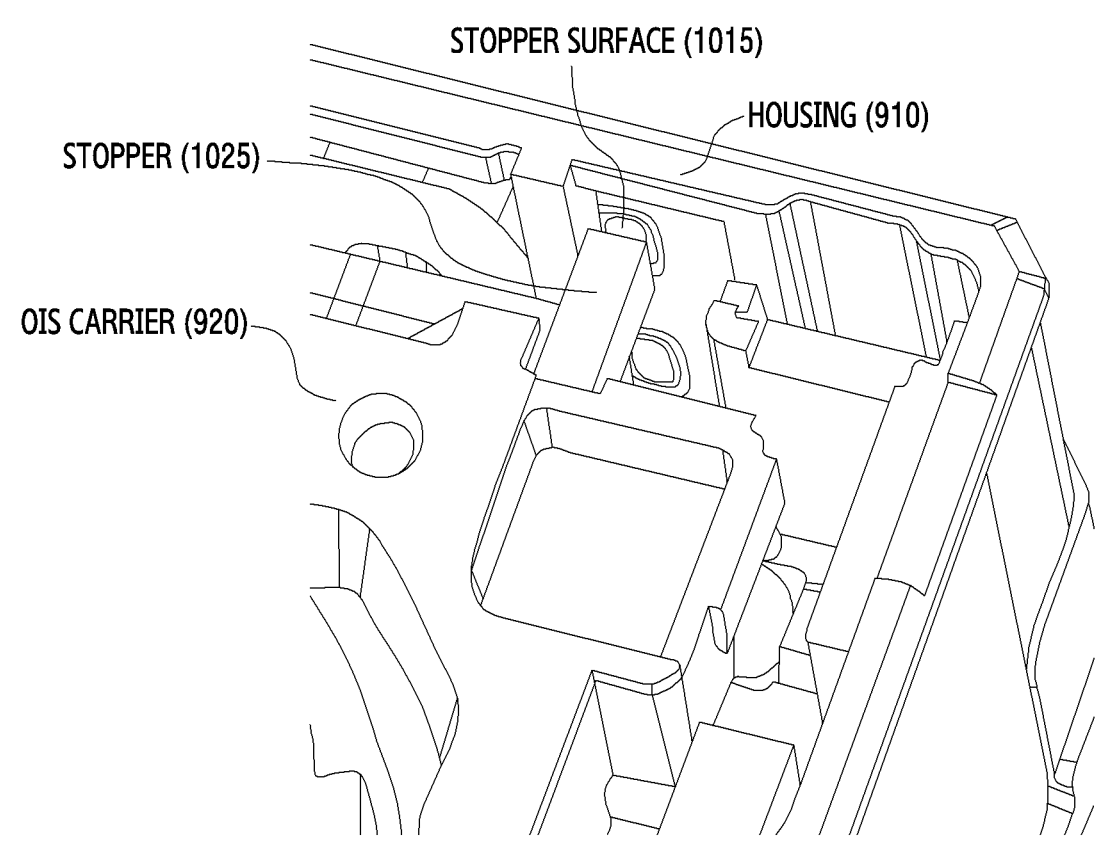
FIG. 10 is a view illustrating examples of a stopper and a stopper surface included in a camera module which supports OIS of a lens shift method according to an embodiment.

FIG. 10 illustrates examples of a stopper and a stopper surface included in a camera module supporting OIS of a lens shift method according to an embodiment.

According to an embodiment, a camera module 180 may include an OIS carrier 920 which accommodates a lens assembly 210 and a housing 910 which accommodates the OIS carrier 920 and forms an exterior of the camera module 180.

According to an embodiment, the camera module 180 may include a stopper 1025 protruding from the OIS carrier 920 toward the housing 910. According to an embodiment, the camera module 180 may further include a stopper surface 1015 formed at least part of a surface of the housing 910 that comes into contact with the stopper 1025 as the OIS carrier 920 is shifted.

According to an embodiment, the stopper surface 1015 formed on the housing 910 may be formed with a material that has a high friction compared to the other surface of the housing 910. For example, the stopper surface 1015 may be at least one of an injection etching surface, a double injection surface (for example, rubber), or a coating surface.

According to an embodiment, while the processor 120 is fixing the OIS driver 320 (for example, the OIS carrier 920) at a position that is biased away from a center of an OIS driving range in a first direction, the stopper 1025 and the stopper surface 1015 may be in contact with each other. Accordingly, even when the electronic device 101 shakes by a specific intensity or greater while the processor 120 is fixing the OIS driver 320, a fixing force of the OIS driver 320 may further be enhanced due to a friction between the stopper 1025 and the stopper surface 1015.

According to an embodiment, the stopper surface 1015 of FIG. 10 may be formed on an inner surface of the housing 910, which is different from the stopper surface 935 of FIG. 9. The housing 910 is fixed, which is different from the AF carrier 930 which is shiftable in a direction substantially parallel to an optical axis. Therefore, when the stopper 1025 comes into contact with the stopper surface 1015, the fixing force of the OIS driver 320 (for example, the OIS carrier 920) may further be enhanced.

Figure 11:
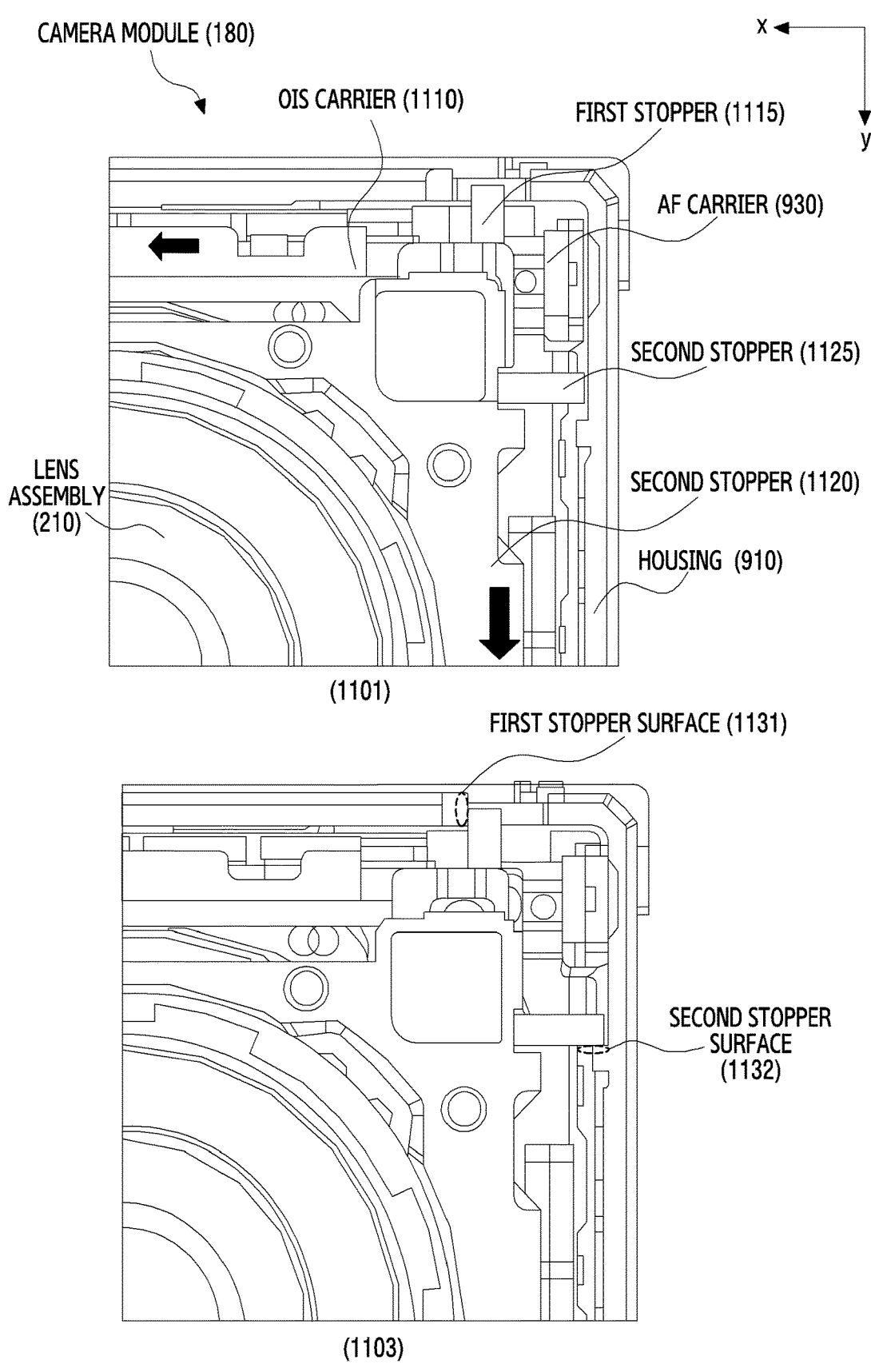
FIG. 11 is a view illustrating examples of a first stopper, a second stopper, a first stopper surface, and a second stopper surface included in a camera module which supports OIS of a lens shift method according to an embodiment.

FIG. 11 illustrates examples of a first stopper, a second stopper, a first stopper surface and a second stopper surface which are included in a camera module supporting OIS of a lens shift method according to an embodiment. A first OIS carrier 1110 and a second OIS carrier 1120 of FIG. 11 may be understood as being included in the OIS carrier 920 of FIG. 10 or corresponding thereto. The first stopper 1115 and the second stopper 1125 of FIG. 11 may be understood as being included in the stopper 1025 of FIG. 10 or corresponding thereto. The first stopper surface 1131 and the second stopper surface 1132 of FIG. 11 may be understood as being included in the stopper surface 1015 of FIG. 10 or corresponding thereto.

According to an embodiment, a camera module 180 may include a lens assembly 210, the first OIS carrier 1110 which shifts the lens assembly 210 in an x-axis direction substantially perpendicular to an optical axis (for example, a z-axis), the second OIS carrier 1120 which shifts the lens assembly 210 in a y-axis direction substantially perpendicular to the optical axis, an AF carrier 930 which shifts the lens assembly 210 in a z-axis direction substantially parallel to the optical axis, and a housing 910 which forms an exterior of the camera module 180. According to an embodiment, the OIS carrier may be formed as one OIS carrier 920 as shown in FIG. 9 or 10, or may be formed as separate first OIS carrier 1110 and second OIS carrier 1120 as shown in FIG. 11. For example, the first OIS carrier 1110 and the second OIS carrier 1120 of FIG. 11 may be formed as separate carriers or may be formed as one carrier.

According to an embodiment, the first stopper 1115 may be formed on a part of an outer surface of the first OIS carrier 1110 to protrude toward the housing 910. The first stopper surface 1131 may be formed on a part of an inner surface of the housing 910. According to an embodiment, the first stopper 1115 may restrict a shift of the OIS driver 320 (for example, the first OIS carrier 1110) in the x-axis direction. For example, comparing the example of reference numeral 1101 and the example of reference numeral 1103, the first stopper 1115 may come into contact with the first stopper surface 1131 as the first OIS carrier 1110 is shifted in the +x direction. When the first stopper 1115 comes into contact with the first stopper surface 1131, the first OIS carrier 1110 may be fixed in the +x direction due to the contact between the first stopper 1115 and the first stopper surface 1131.

According to an embodiment, the second stopper 1125 may be formed on a part of an outer surface of the second OIS carrier 1120 to protrude toward the housing 910. The second stopper surface 1132 may be formed on a part of an inner surface of the housing 910. According to an embodiment, the second stopper 1115 may restrict a shift of the OIS driver 320 (for example, the second OIS carrier 1120) in the y-axis direction. For example, comparing the example of reference numeral 1101 and the example of reference numeral 1103, the second stopper 1125 may come into contact with the second stopper surface 1132 as the second OIS carrier 1120 is shifted in the +y direction. When the second stopper 1125 comes into contact with the second stopper surface 1132, the second OIS carrier 1120 may be fixed in the +y direction due to the contact between the second stopper 1125 and the second stopper surface 1132.

According to an embodiment, when the OIS driver 320 is fixed as the stopper (for example, the stopper 1025, the first stopper 1115, the second stopper 1125) formed on the OIS carrier (for example, the OIS carrier 920, the first OIS carrier 1110, the second OIS carrier 1120) comes into contact with the stopper surface (for example, the stopper surface 1015, the first stopper surface 1131, the second stopper surface 1132) formed on the housing 910 as shown in FIG. 10 or 11, the OIS driver 320 may be fixed not only in a direction substantially perpendicular to the optical axis, but also in a direction substantially parallel to the optical axis. For example, since the housing 910 is fixed, which is different from the AF carrier 930 which is shiftable in a direction parallel to an optical axis, not only shaking in a direction substantially perpendicular to the optical axis of the OIS driver 320, but also shaking in a direction substantially parallel to the optical axis may be reduced.

Figure 12:
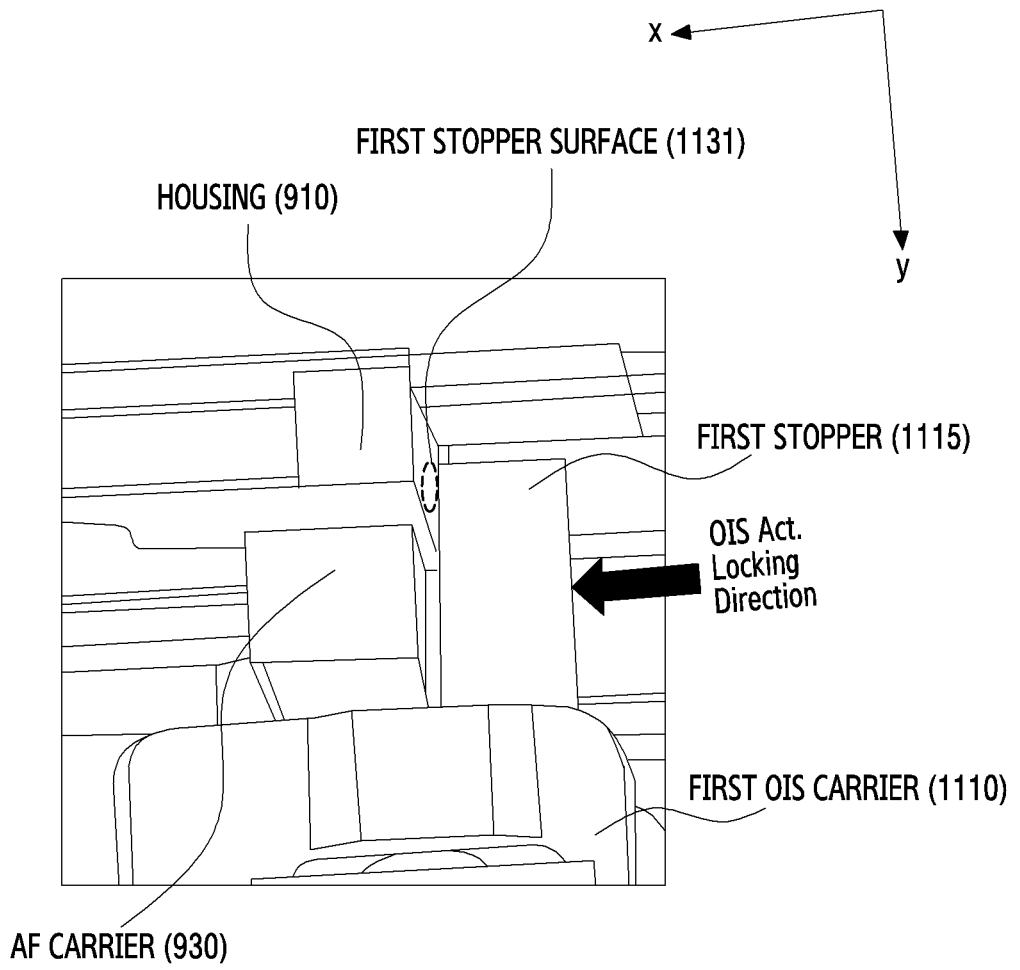
FIG. 12 is a view illustrating a direction in which an OIS driver is fixed by a first stopper and a second stopper surface included in a camera module which supports OIS of a lens shift method according to an embodiment.

FIG. 12 illustrates a direction in which an OIS driver is fixed by a first stopper and a second stopper surface which are included in a camera module supporting OIS of a lens shift method according to an embodiment.

According to an embodiment, FIG. 12 is an enlarged view of the structures of the housing 910, the AF carrier 930, the first OIS carrier 1110, the first stopper 1115, and the first stopper surface 1131 shown in FIG. 11. Referring to FIG. 12, when the first OIS carrier 1110 shifts in the +x direction and the first stopper 1115 comes into contact with the first stopper surface 1131, the first stopper 1115 may be physically fixed by the first stopper surface 1131. Accordingly, the OIS driver 320 (for example, the first OIS carrier 1110) may be fixed in the +x direction.

According to an embodiment, when the first OIS carrier 1110 and the housing 910 come into close contact with each other, a tilt of the AF carrier 930 may also be reduced due to a friction occurring on a contact surface between the first stopper 1115 and the first stopper surface 1131. Accordingly, shaking of image frames obtained while the first stopper 1115 and the first stopper surface 1131 are in contact with each other may be reduced, so that quality of image frames may be enhanced.

Figure 13:
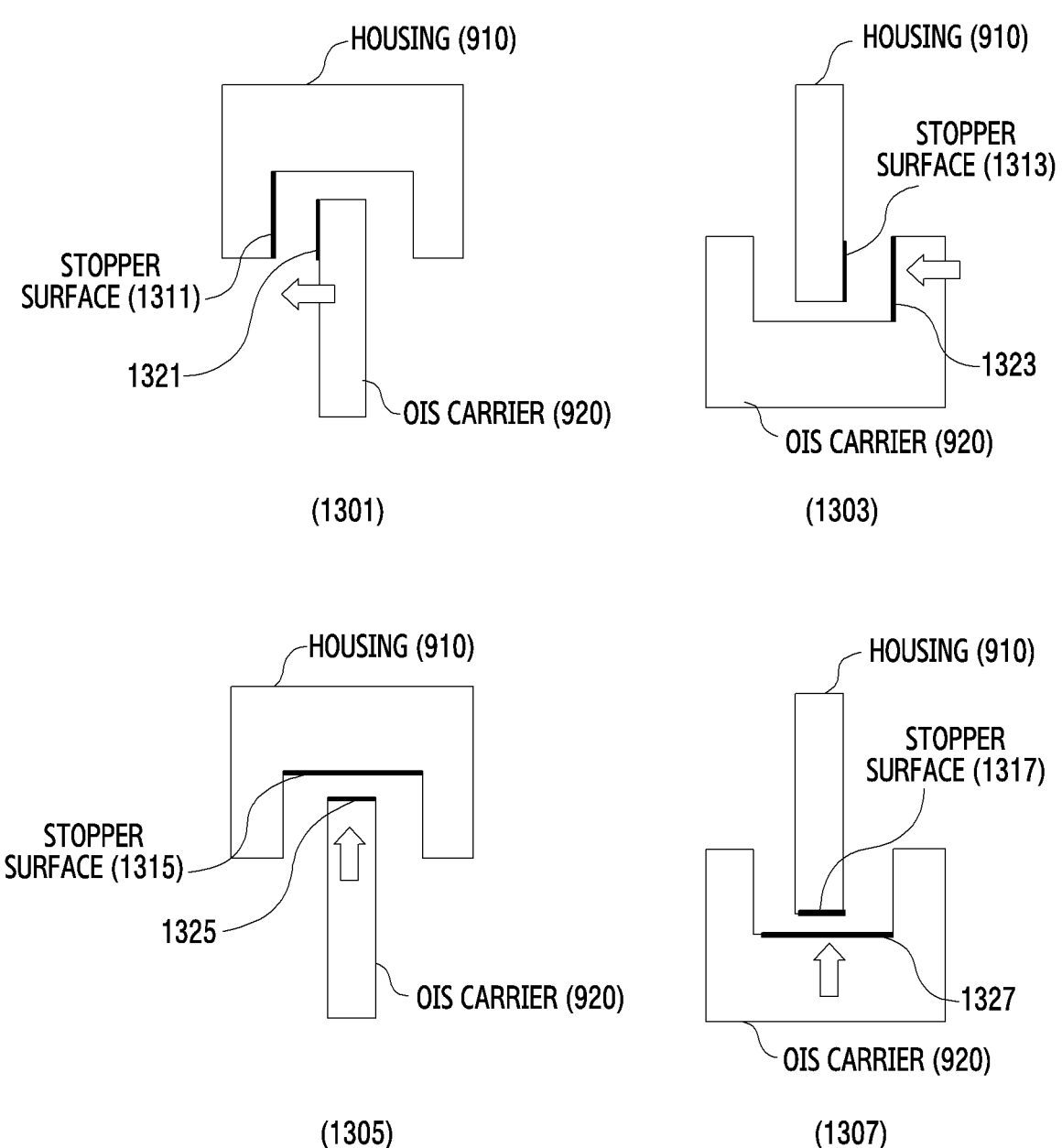
FIG. 13 is a view illustrating various examples of a stopper and a stopper surface according to an embodiment.

FIG. 13 illustrates various examples of a stopper and a stopper surface according to an embodiment. FIG. 13 illustrates examples of the structure in which the stopper (for example, the stopper 1025, the first stopper 1115, the second stopper 1125, and the stopper surface (for example, the stopper surface 1015, the first stopper surface 1131, the second stopper surface 1132) described in FIGS. 10 to 12 are formed on the OIS carrier 920 (or the first OIS carrier 1110, the second OIS carrier 1120) and the housing 910, respectively. The housing 910 and the OIS carrier 920 of FIG. 13 are schematically illustrated to explain examples of the stopper and the stopper surface.

According to an embodiment, in an example of reference numeral 1301, when the OIS carrier 920 shifts to the left, one surface 1321 of the stopper and the stopper surface 1311 of the housing 910 may come into contact with each other. The OIS carrier 920 may be physically fixed not to shift further to the left due to the contact between one surface 1321 of the stopper and the stopper surface 1311.

According to an embodiment, in an example of reference numeral 1303, when the OIS carrier 920 shifts to the left, one surface 1323 of the stopper and the stopper surface 1311 of the housing 910 may come into contact with each other. The OIS carrier 920 may be physically fixed not to shift further to the left due to the contact between one surface 1331 of the stopper and the stopper surface 1313.

Comparing the example of reference numeral 1301 and the example of reference numeral 1303, reference numeral 1301 shows a structure in which the stopper of the OIS carrier 920 shifts in a space defined by a recess formed on the housing 910 and comes into contact with the stopper surface 1311, thereby being fixed, and reference numeral 1303 shows a structure in which a space defined by a recess formed on the OIS carrier 920 shifts and comes into contact with the stopper surface 1313 of the housing 910, thereby being fixed.

According to an embodiment, in an example of reference numeral 1305, the OIS carrier 920 may move up such that one surface 1327 of the stopper comes into contact with the stopper surface 1315 of the housing 910. The OIS carrier 920 may be physically fixed not to move up further due to the contact between one surface 1325 of the stopper and stopper surface 1315.

According to an embodiment, in an example of reference numeral 1307, the OIS carrier 920 may move up such that one surface 1327 of the stopper comes into contact with the stopper surface 1317 of the housing 910. The OIS carrier 920 may be physically fixed not to move up further due to the contact between one surface 1327 of the stopper and the stopper surface 1317.

Comparing the example of reference numeral 1305 and the example of reference numeral 1307, reference numeral 1305 shows a structure in which the stopper of the OIS carrier 920 shifts in a space defined by a recess formed on the housing 910 and comes into contact with the stopper surface 1315, thereby being fixed, and reference numeral 1307 shows a structure in which a space defined by a recess formed on the OIS carrier 920 shifts and comes into contact with the stopper surface 1317 of the housing 910, thereby being fixed.

According to an embodiment, at least one surface of one surface 1321, 1323, 1325, 1327 of the stopper and the stopper surface 1311, 1313, 1315, 1317 may be formed as at least one of a surface that is formed with a plastic injection material and has its roughness adjusted, a surface that is coated with a high-friction material such as urethane coating, or a surface that is covered with other materials having a high friction such as silicon or rubber.

Figure 14:
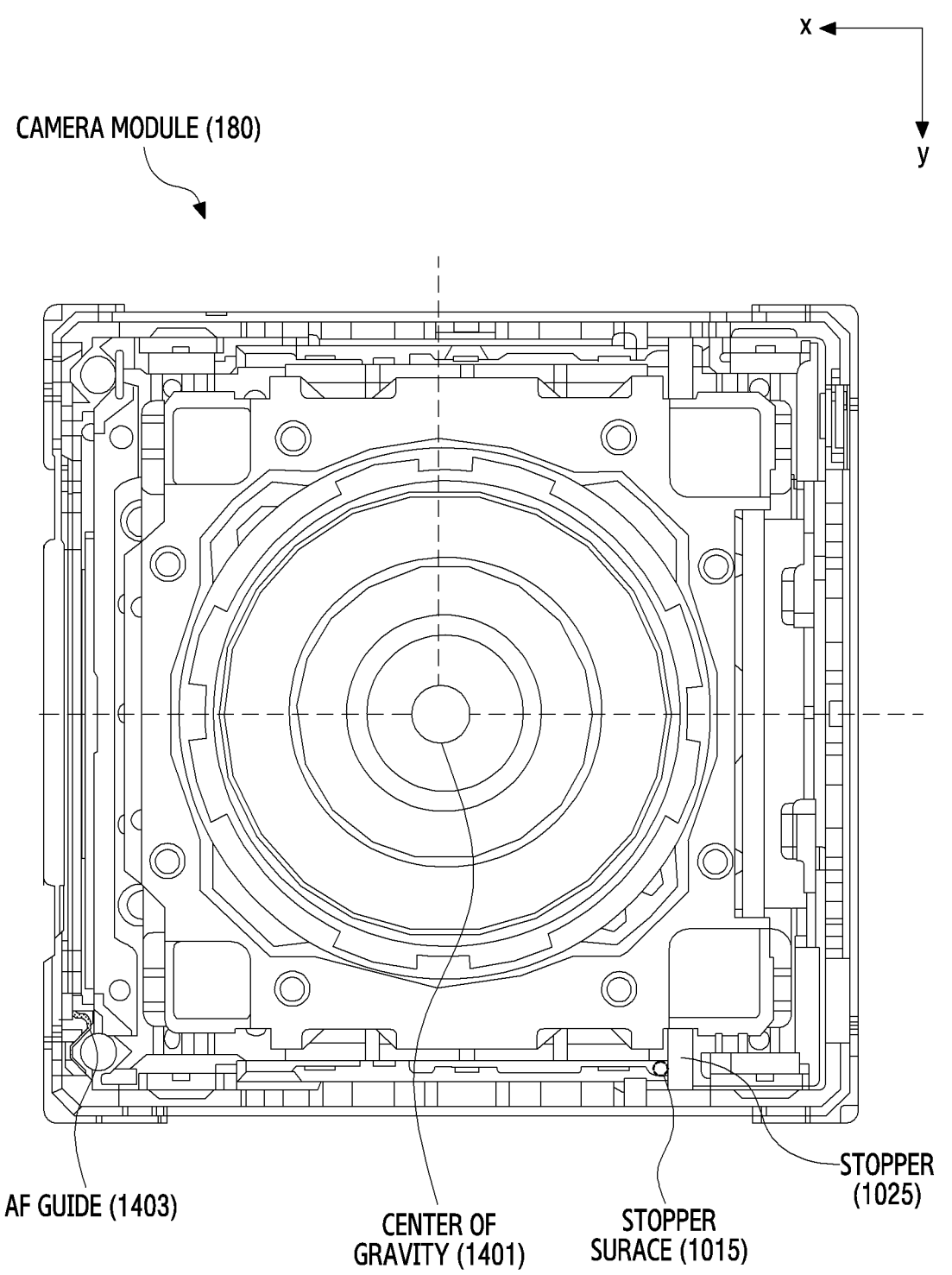
FIG. 14 is a view illustrating examples of positions where a stopper and a stopper surface are formed inside a camera module which supports OIS of a lens shift method according to an embodiment.

FIG. 14 illustrates examples of positions of a stopper and a stopper surface which are formed in a camera module supporting OIS of a lens shift method according to an embodiment.

According to an embodiment, the stopper 1025 and the stopper surface 1015 described in FIGS. 10 to 13 may be formed in the opposite direction of an AF guide 1403. For example, when the AF guide 1403 is disposed close to a side surface of the camera module 180 in the +x direction, the stopper 1025 and the stopper surface 1015 may be formed close to a side surface of the camera module 180 in the −x direction. The stopper 1025 and the stopper surface 1015 should be formed in the opposite direction of the AF guide 1403 in order to enhance a fixing force of the OIS driver 320.

According to an embodiment, as the stopper 1025 and the stopper surface 1015 described in FIGS. 10 to 13 are formed further away from the center of gravity 1401 of the camera module 180, the fixing force of the OIS driver 320 may further be enhanced.

Figure 15:
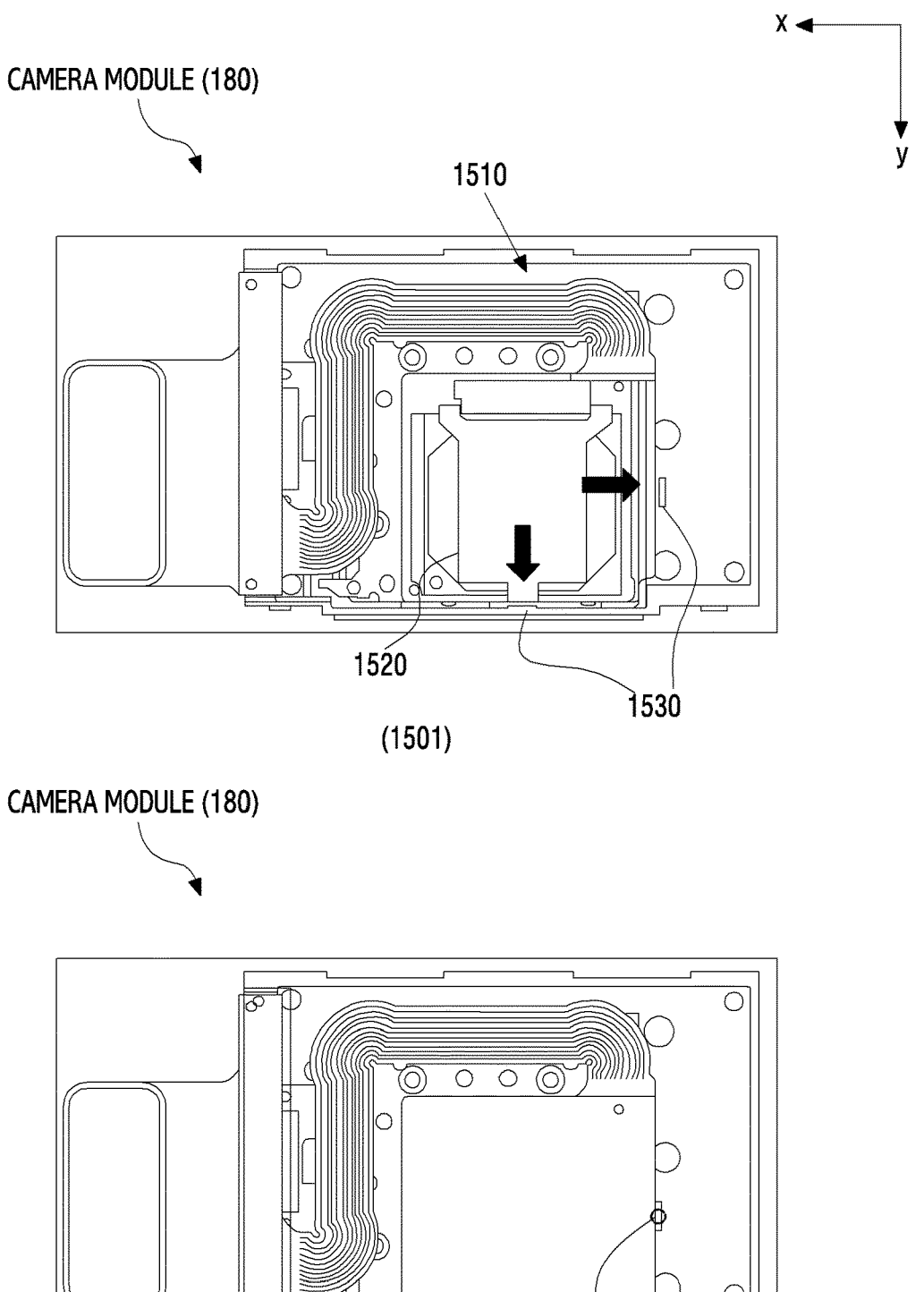
FIG. 15 is a view illustrating an example in which an OIS driver is fixed in a camera module which supports OIS of a sensor shift method according to an embodiment.
Figure 16:
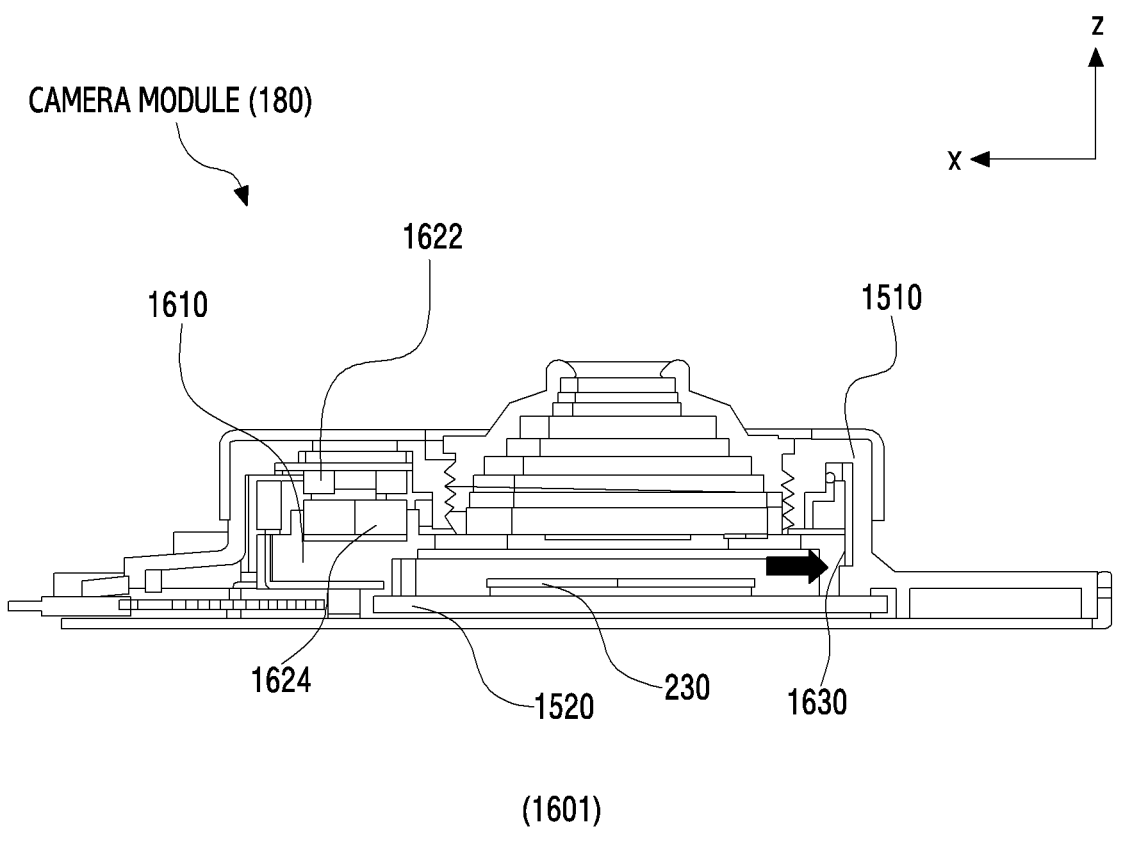
FIG. 16 is a view illustrating an example in which an OIS driver is fixed in a camera module which supports OIS of a sensor shift method according to an embodiment.
Figure 16:
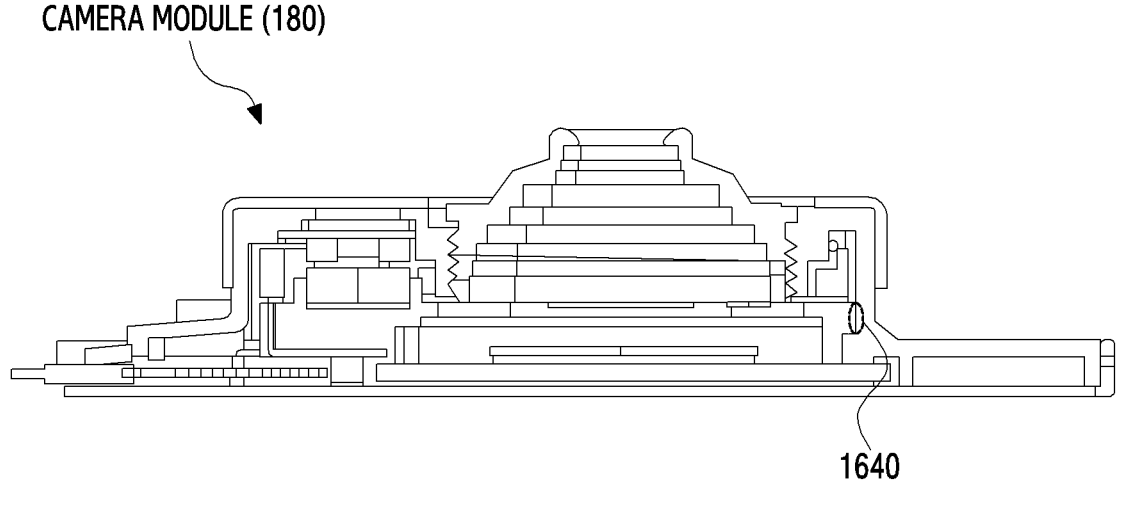
Figure 17:
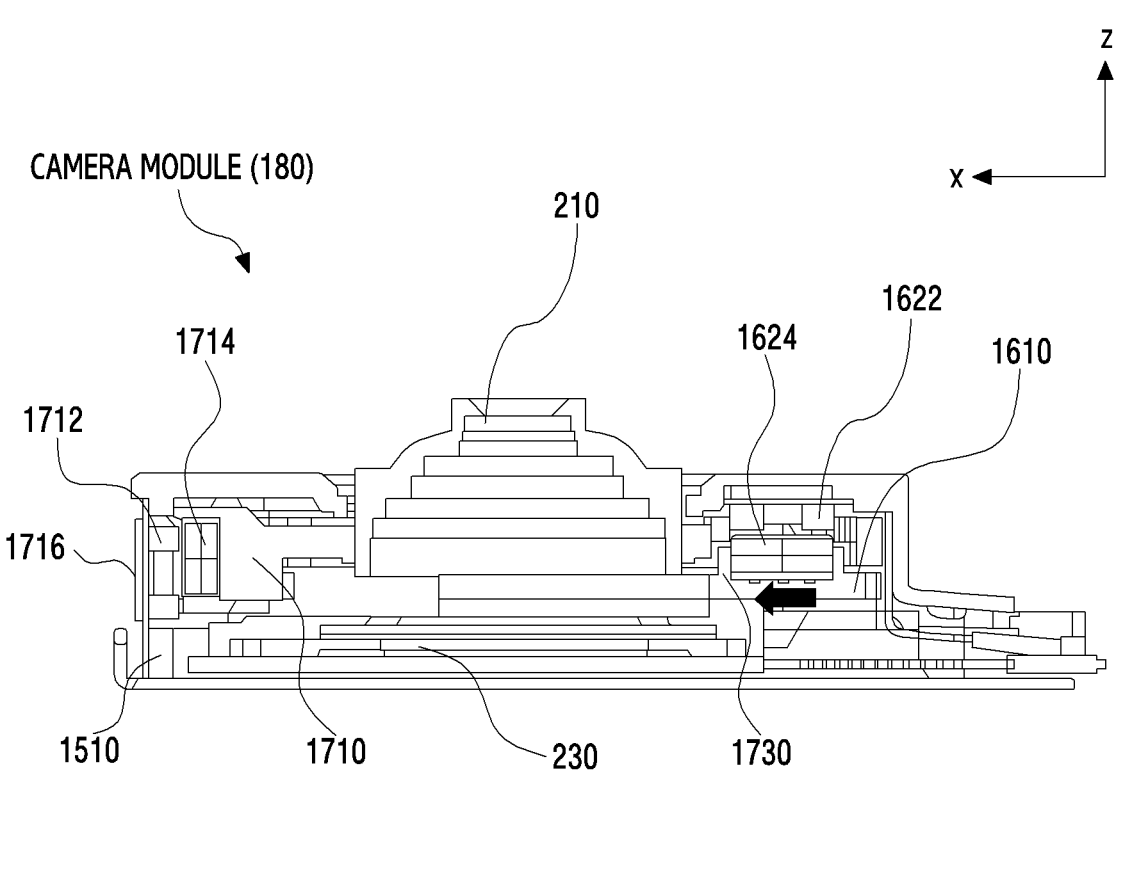
FIG. 17 is a view illustrating an example in which an OIS driver is fixed in a camera module which supports OIS of a sensor shift method according to an embodiment.
Figure 17:
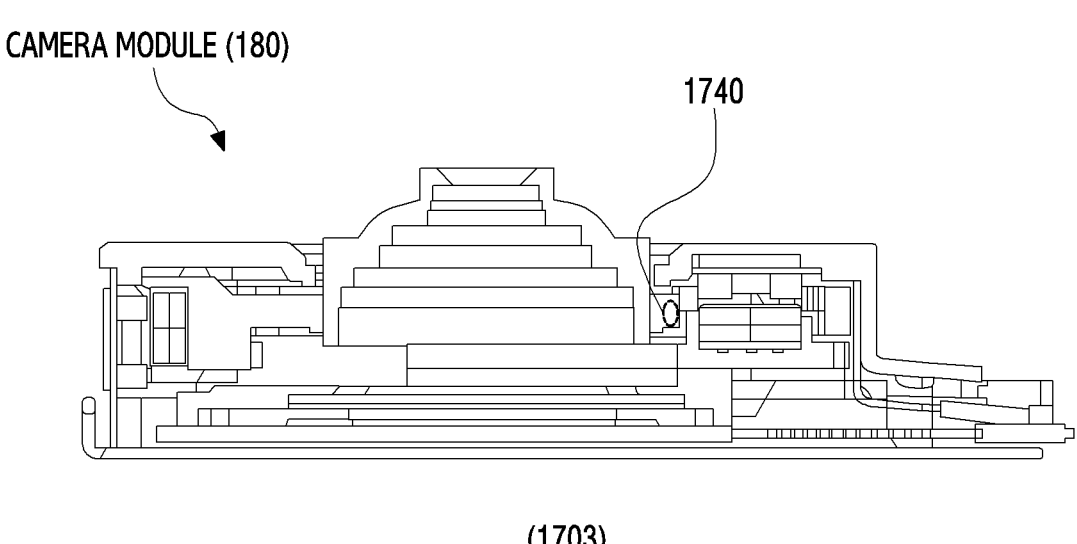

FIG. 15 illustrates an example of an OIS driver which is fixed in a camera module supporting OIS of a sensor shift method according to an embodiment. FIGS. 15 to 17 illustrate an example of an additional structure for further enhancing a fixing force of the OIS driver 320 in the electronic device 101 supporting OIS of a sensor shift method.

According to an embodiment, in the camera module 180 supporting the OIS of the sensor shift method, shaking of the electronic device 101 may be offset by shifting the image sensor 230 in a direction substantially perpendicular to an optical axis. For example, the camera module 180 may include a housing 1510 forming an exterior of the camera module 180, a sensor PCB 1520 including the image sensor 230, and a sensor stopper 1530 which is formed in the housing 1510 to restrict a movement of the sensor PCB 1520. The camera module 180 may further include an additional configuration (for example, the lens assembly 210) besides the components illustrated in FIG. 15.

According to an embodiment, comparing examples of reference numeral 1501 and reference numeral 1503, the sensor PCB 1520 may shift in the −x direction and/or +y direction, such that the sensor PCB 1520 comes into contact with a fixing surface 1540 of the sensor stopper 1530. The sensor PCB 1520 may be fixed not to shift further in the −x direction and/or +y direction due to the fixing surface 1540 of the sensor stopper 1530.

FIG. 16 illustrates an example of an OIS driver which is fixed in a camera module supporting OIS of a sensor shift method according to an embodiment.

According to an embodiment, the camera module 180 may include a sensor carrier 1610 which shifts an image sensor 230 and a sensor PCB 1520 in a direction substantially perpendicular to an optical axis, and a housing 1510 which forms an exterior of the camera module 180. The processor 120 may control a current applied to a coil 1622 to shift the sensor carrier 1610 in a direction (for example, an x-axis direction) substantially perpendicular to the optical axis by using an electromagnetic force between the coil 1622 and a magnet 1624.

According to an embodiment, the camera module 180 may include a sensor stopper 1630 which is formed on a part of an outer surface of the sensor carrier 1610, and a fixing surface 1640 which is formed on a part of an inner surface of the housing 1510. Comparing examples of reference numeral 1610 and reference numeral 1603, the sensor carrier 1610 shifts in the −x direction, such that the sensor stopper 1630 comes into contact with the fixing surface 1640 of the housing 1510. The sensor carrier 1610 may be fixed not to shift further in the −x direction due to the contact between the sensor stopper 1630 and the fixing surface 1640.

According to an embodiment, in FIG. 16, the sensor stopper 1630 formed on the sensor carrier 1610 may be fixed by the fixing surface 1640 of the housing 1510, which is different from the example of FIG. 15 in which the sensor PCB 1520 is fixed by the stopper 1530 of the housing 1510. In addition, various structures for restricting a movement of the image sensor 230 may be used.

FIG. 17 illustrates an example of an OIS driver which is fixed in a camera module supporting OIS of a sensor shift method according to an embodiment.

According to an embodiment, the camera module 180 of FIG. 17 may further perform an AF function compared to the camera module 180 shown in FIG. 16. For example, the camera module 180 of FIG. 17 may include a housing 1510, a sensor carrier 1610 which shifts the image sensor 230 in a direction substantially perpendicular to an optical axis, and a coil 1622 and a magnet 1624 for driving the sensor carrier 1610. In addition, the camera module 180 of FIG. 17 may further include an AF carrier 1710 which shifts a lens assembly 210 in a direction substantially parallel to the optical axis, an AF coil 1712 and an AF magnet 1714 for driving the AF carrier 1710, and a yoke 1716.

According to an embodiment, the camera module 180 may include a sensor stopper 1730 which is formed on the sensor carrier 1610, and a fixing surface 1740 which is formed on one surface of the AF carrier 1710. According to an embodiment, comparing examples of reference numeral 1701 and reference numeral 1703, the sensor carrier 1610 may shift in the +x direction, thereby causing the sensor stopper 1730 and the fixing surface 1740 to come into contact with each other. For example, the +x direction may refer to a direction in which the AF carrier 1710 is attracted by the yoke 1716. The sensor carrier 1610 may be fixed not to shift further in the +x direction due to the contact between the sensor stopper 1730 and the fixing surface 1740.

According to an embodiment, in the camera module 180 illustrated in FIG. 17, the sensor stopper 1730 may be fixed by the fixing surface 1740 formed on the AF carrier 1710, which is different from the camera module 180 illustrated in FIG. 16 in which the sensor stopper 1630 is fixed by the fixing surface 1640 formed on the housing 1510. Beside this, various structures for restricting a movement of the image sensor 230 may be used.

Figure 18:
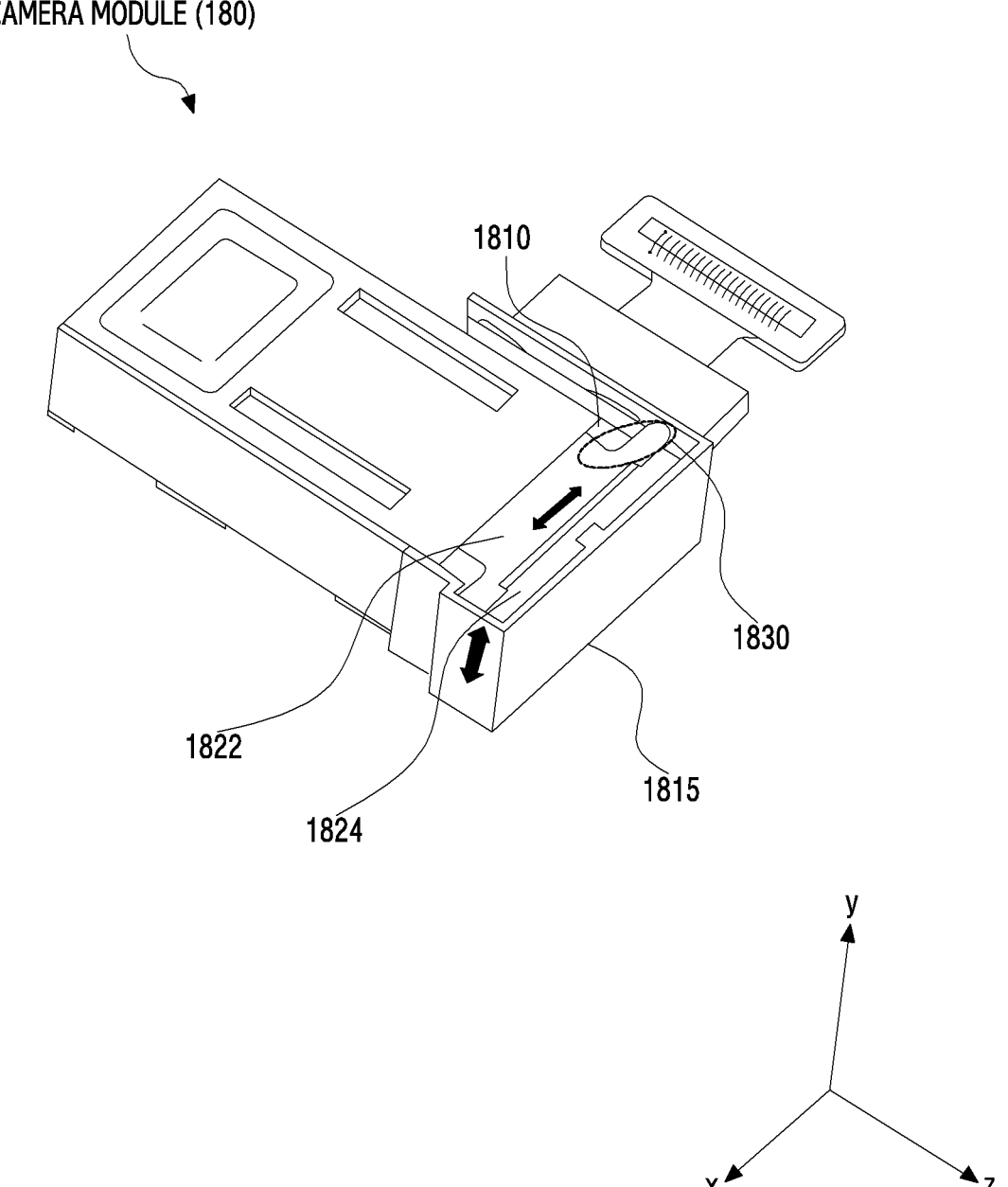
FIG. 18 is a view illustrating a structure of a folded camera module supporting OIS of a sensor shift method according to an embodiment.
Figure 19:
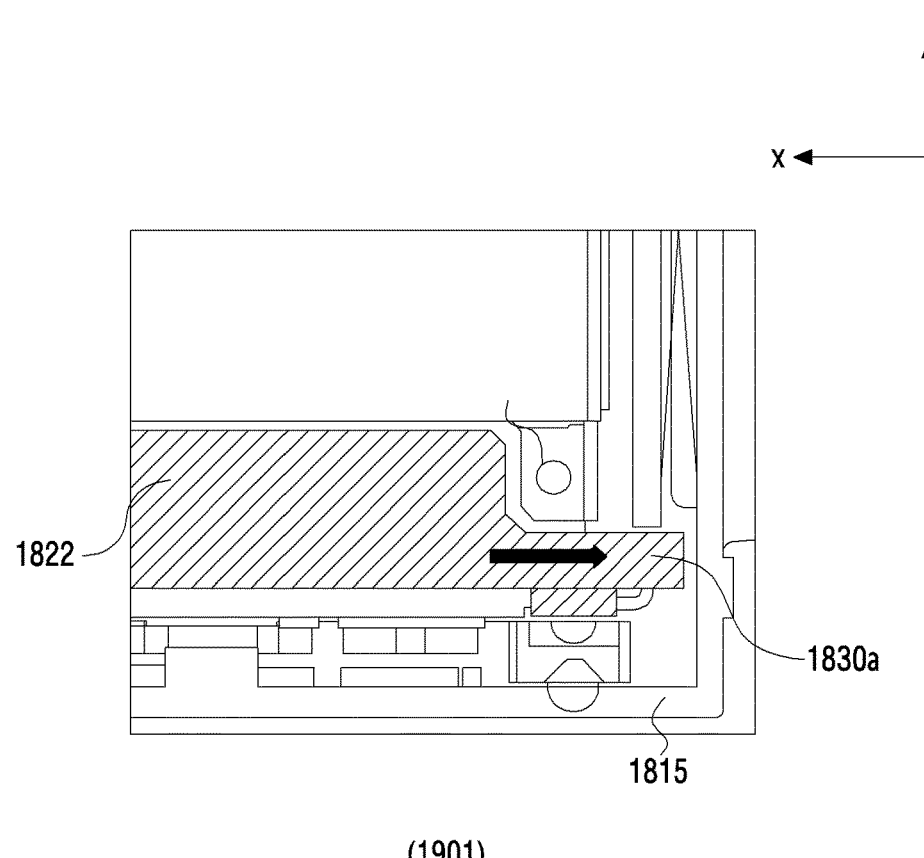
FIG. 19 is a view illustrating an example in which an OIS driver is fixed in a folded camera module supporting OIS of a sensor shift method according to an embodiment.
Figure 19:
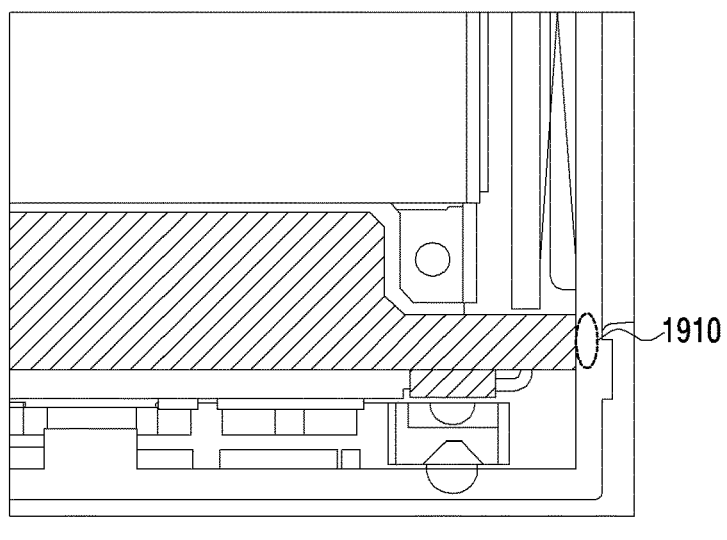
Figure 20:
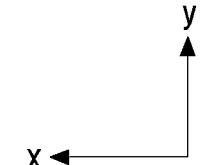
FIG. 20 is a view illustrating an example in which an OIS driver is fixed in a folded camera module supporting OIS of a sensor shift method according to an embodiment.
Figure 20:
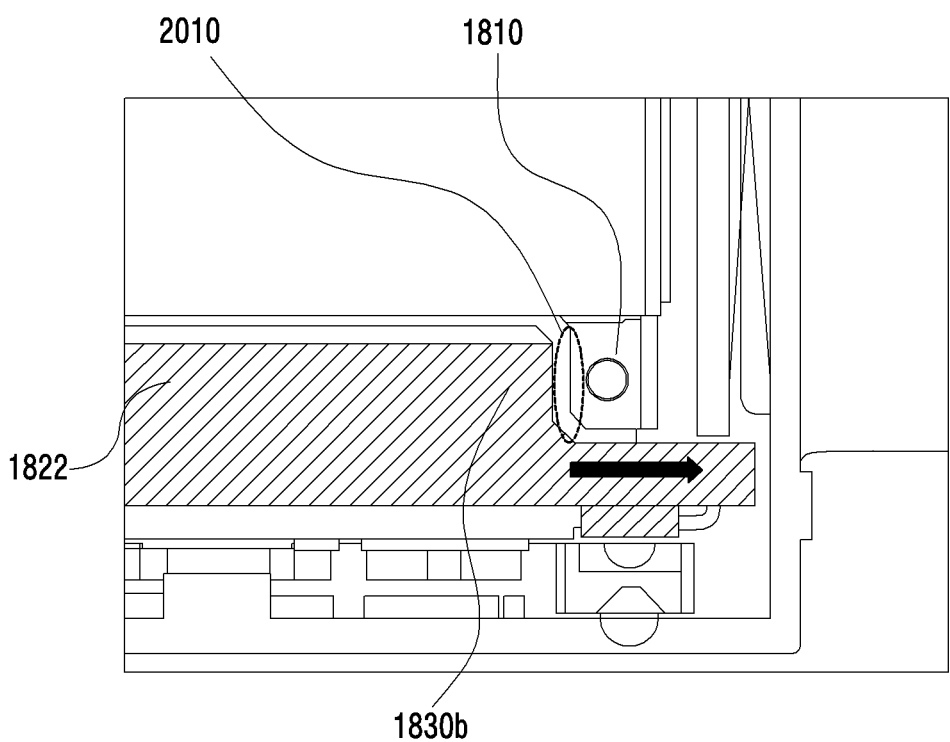

FIG. 18 illustrates a structure of a folded camera module supporting OIS of a sensor shift method according to an embodiment. In FIGS. 18 to 20, an example of an additional structure for further enhancing a fixing force of the OIS driver 320 in the electronic device 101 which includes the folded camera module supporting the OIS of the sensor shift method is illustrated.

According to an embodiment, the camera module 180 may include a housing 1810 and a fixing frame 1815. In addition, the camera module 180 supporting the OIS of the sensor shift method may include a first sensor carrier 1822 to shift an image sensor 230 in an x-axis direction, and a second sensor carrier 1824 to shift the image sensor 230 in a y-axis direction. According to an embodiment, in the camera module 180 of a periscope method, the z-axis may refer to an axis of light that is refracted by a reflector, and the x-axis and the y-axis may refer to an axis substantially perpendicular to the axis of refracted light.

According to an embodiment, the camera module 180 may include a sensor stopper 1830 formed on a certain area of the first sensor carrier 1822. The sensor stopper 1830 will be described with reference to FIGS. 19 and 20.

FIG. 19 illustrates an example of an OIS driver which is fixed in a folded camera module supporting OIS of a sensor shift method according to an embodiment.

According to an embodiment, a sensor stopper 1830*a* may be formed on a certain area of the first sensor carrier 1822, and a fixing surface 1910 may be formed on a certain area of an inner surface of the fixing frame 1815. Comparing examples of reference numeral 1901 and reference numeral 1903, when the first sensor carrier 1822 shifts in the −x direction, the sensor stopper 1830*a* may come into contact with the fixing surface 1910. The first sensor carrier 1822 may be fixed not to shift further in the −x direction due to the contact between the sensor stopper 1830*a* and the fixing surface 1910.

FIG. 20 illustrates an example of an OIS driver which is fixed in a folded camera module supporting OIS of a sensor shift method according to an embodiment.

According to an embodiment, a sensor stopper 1830*b* may be formed on a certain area of a first sensor carrier 1822, and a fixing surface 2010 may be formed on a certain area of a housing 1810. When the first sensor carrier 1822 shifts in the −x direction, the sensor stopper 1830*b* may come into contact with the fixing surface 2010 of the housing 1810. The first sensor carrier 1822 may be fixed not to shift further in the −x direction due to the contact between the sensor stopper 1830*b* and the fixing surface 2010.

According to an embodiment, an electronic device 101 may include: a camera module 180 including an optical image stabilization (OIS) driver 320 which is shiftable within an OIS driving range; and at least one processor 120 electrically connected with the camera module 180. The at least one processor 120 may: control the camera module 180 to fix the OIS driver 320 at a position that is biased away from a center of the OIS driving range in a first direction; obtain image frames through the camera module 180 while fixing the OIS driver 320; and obtain a moving image by performing at least one of video digital image stabilization (VDIS) or electronic image stabilization (EIS) with respect to the image frames.

According to an embodiment, the electronic device 101 may further include a sensor 320 to detect a movement of the electronic device 101, and the at least one processor 120 may: identify a direction of gravity exerted to the electronic device 101 through the sensor 310; and determine the first direction based on the direction of gravity.

In the electronic device 101 according to an embodiment, the first direction may be parallel to the direction of gravity.

In the electronic device 101 according to an embodiment, the OIS driver 320 may include a lens assembly 210 which is aligned along an optical axis, and the OIS driving range may correspond to a range within which the lens assembly 210 is shiftable in a direction perpendicular to the optical axis.

In the electronic device according to an embodiment, the camera module 180 may include: a housing to accommodate the lens assembly 210; a first OIS magnet fixed to a first side surface of the lens assembly; a second OIS magnet fixed to a second side surface of the lens assembly; a first OIS coil 701 fixed to a first inner surface of the housing to face the first OIS magnet; and a second OIS coil 702 fixed to a second inner surface of the housing to face the second OIS magnet.

In the electronic device according to an embodiment, the least one processor may control a current applied to at least one of the first OIS coil 701 or the second OIS coil 702 to fix the OIS driver 320 at a position that is biased away from the center of the OIS driving range in the first direction.

In the electronic device according to an embodiment, the camera module 180 may further include: a first position sensor 703 disposed on the first inner surface of the housing or a surface facing the first inner surface to identify a position of the lens assembly 210 on a first axis; and a second position sensor 704 disposed on the second inner surface of the housing or a surface facing the second inner surface to identify a position of the lens assembly 210 on a second axis. The at least one processor may: identify a degree of movement of the electronic device 100 through the sensor 310; control an intensity of a current applied to the first OIS coil 701 based on the degree of movement of the electronic device without using a result of identifying by the first position sensor 703; and control a current applied to the second OIS coil 702 by using a result of identifying by the second position sensor 704, and the first direction may be parallel to the first axis.

In the electronic device 101 according to an embodiment, the camera module 180 may further include: a first position sensor 703 disposed on the first inner surface of the housing or a surface facing the first inner surface to identify a position of the lens assembly 210 on a first axis; and a second position sensor 704 disposed on the second inner surface of the housing or a surface facing the second inner surface to identify a position of the lens assembly 210 on a second axis. The at least one processor 120 may: identify a degree of movement of the electronic device 101 through the sensor 310; control an intensity of a current applied to the first OIS coil 701 based on the degree of movement of the electronic device without using a result of identifying by the first position sensor 703; and control an intensity of a current applied to the second OIS coil 702 based on the degree of movement of the electronic device without using a result of identifying by the second position sensor 704, and the first direction may be distinguished from the first axis and the second axis.

The electronic device 101 according to an embodiment may further include an illuminance sensor to measure ambient illuminance of the electronic device, and the at least one processor 120 may: determine a video shooting mode of the electronic device to a first mode, based on a result of measuring by the illuminance sensor; and, in response to the video shooting mode being the first mode, fix the OIS driver 320 at a position that is biased away from the center of the OIS driving range in the first direction.

In the electronic device 101 according to an embodiment, the at least one processor 120 may determine the video shooting mode to the first mode when the ambient illuminance of the electronic device is greater than or equal to a threshold value.

In the electronic device 101 according to an embodiment, in response to the video shooting mode of the electronic device being a second mode, the at least one processor 120 may control the camera module to shift the OIS driver 320 within the OIS driving range.

In the electronic device 101 according to an embodiment, the OIS driver 320 may include an image sensor 230, and the OIS driving range may correspond to a range within which the image sensor is shiftable.

An operating method of the electronic device according to an embodiment may include: controlling a camera module 180 included in the electronic device to fix an OIS driver 320 in the camera module 180 at a position that is biased away from a center of an OIS driving range in a first direction; obtaining image frames through the camera module 180 while fixing the OIS driver 320; and obtaining a moving image by performing at least one of VDIS or EIS with respect to the image frames.

The operating method of the electronic device 101 according to an embodiment may further include: identifying a direction of gravity exerted to the electronic device through a sensor 310 which detects a movement of the electronic device; and determining the first direction based on the direction of gravity.

The operating method of the electronic device 101 according to an embodiment may include: determining a video shooting mode; and, in response to the video shooting mode being determined to a first mode, controlling the camera module 180 to fix the OIS driver 320 at a position that is biased away from the center of the OIS driving range in the first direction.

According to an embodiment, an electronic device 101 may include: a camera module 180; a sensor 310 to detect a movement of the electronic device; and at least one processor 120 electrically connected with the camera module and the sensor. The camera module 180 may include: a lens assembly 210 aligned with an optical axis; an OIS carrier 920 to accommodate the lens assembly and to be shiftable in a direction parallel to the optical axis within an OIS driving range; and a housing 910 to accommodate the lens assembly and the OIS carrier. The at least one processor 120 may: identify a direction of gravity exerted to the electronic device through the sensor; control the camera module 180 to fix the OIS carrier 920 at a position that is biased away from a center of the OIS driving range in a first direction, the first direction being determined based on the direction of gravity; obtain image frames through the camera module while fixing the OIS carrier; and obtain a moving image by performing at least one of video digital image stabilization (VDIS) or electronic image stabilization (EIS) with respect to the image frames.

In the electronic device 101 according to an embodiment, the OIS carrier 920 may include a stopper (for example, the stopper 925, the stopper 925, the first stopper 1115, the second stopper 1125) protruding toward the housing, and the housing 910 may include a stopper surface (for example, the stopper surface 935, the stopper surface 1015, the first stopper surface 1131, the second stopper surface 1132, the stopper surface 1311, 1313, 1315, 1317) which is formed on at least part of a surface that comes into contact with the stopper as the OIS carrier is shifted.

In the electronic device 101 according to an embodiment, the stopper surface may be formed with a material that has a high friction compared to other surfaces.

In the electronic device 101 according to an embodiment, the stopper surface may be at least one of an injection etching surface, a double injection surface, or a coating surface.

In the electronic device 101 according to an embodiment, the stopper and the stopper surface may come into contact with each other while the OIS carrier 920 is being fixed at the position that is biased away from the center of the OIS driving range in the first direction.

What is claimed is:

1. An electronic device comprising:
   a camera module comprising an optical image stabilization (OIS) driver, wherein the OIS driver is shiftable within an OIS driving range; and
   at least one processor electrically connected with the camera module,
   wherein the at least one processor is configured to:
   control the camera module to fix the OIS driver at a position that is biased away from a center of the OIS driving range in a first direction while the OIS driver is operating,
   obtain image frames through the camera module while fixing the OIS driver, and
   obtain a moving image by performing at least one of video digital image stabilization (VDIS) or electronic image stabilization (EIS) with respect to the image frames.

2. The electronic device of claim 1, further comprising:
   a sensor configured to detect a movement of the electronic device,
   wherein the at least one processor is configured to:
   identify a direction of gravity exerted to the electronic device through the sensor, and
   determine the first direction based on the direction of gravity.

3. The electronic device of claim 2, wherein the first direction is parallel to the direction of gravity.

4. The electronic device of claim 2,
   wherein the OIS driver comprises a lens assembly which is aligned along an optical axis, and wherein the OIS driving range corresponds to a range within which the lens assembly is shiftable in a direction perpendicular to the optical axis.

5. The electronic device of claim 4, wherein the camera module comprises:
   a housing configured to accommodate the lens assembly;
   a first OIS magnet fixed to a first side surface of the lens assembly;
   a second OIS magnet fixed to a second side surface of the lens assembly;
   a first OIS coil fixed to a first inner surface of the housing to face the first OIS magnet; and
   a second OIS coil fixed to a second inner surface of the housing to face the second OIS magnet.

6. The electronic device of claim 5, wherein the at least one processor is configured to control a current applied to at least one of the first OIS coil or the second OIS coil to fix the OIS driver at a position that is biased away from the center of the OIS driving range in the first direction.

7. The electronic device of claim 5,
   wherein the camera module further comprises:
      a first position sensor disposed on the first inner surface of the housing or a surface facing the first inner surface to identify a position of the lens assembly on a first axis; and
      a second position sensor disposed on the second inner surface of the housing or a surface facing the second inner surface to identify a position of the lens assembly on a second axis,
   wherein the at least one processor is configured to:
      identify a degree of movement of the electronic device through the sensor,
      control an intensity of a current applied to the first OIS coil based on the degree of movement of the electronic device without using a result of identifying by the first position sensor, and
      control a current applied to the second OIS coil by using a result of identifying by the second position sensor, and
   wherein the first direction is parallel to the first axis.

8. The electronic device of claim 5,
   wherein the camera module further comprises:
      a first position sensor disposed on the first inner surface of the housing or a surface facing the first inner surface to identify a position of the lens assembly on a first axis; and
      a second position sensor disposed on the second inner surface of the housing or a surface facing the second inner surface to identify a position of the lens assembly on a second axis,
   wherein the at least one processor is configured to:
      identify a degree of movement of the electronic device through the sensor,
      control an intensity of a current applied to the first OIS coil based on the degree of movement of the electronic device without using a result of identifying by the first position sensor, and control an intensity of a current applied to the second OIS coil based on the degree of movement of the electronic device without using a result of identifying by the second position sensor, and
   wherein the first direction is distinguished from the first axis and the second axis.

9. The electronic device of claim 1, further comprising:
   an illuminance sensor configured to measure ambient illuminance of the electronic device,
   wherein the at least one processor is configured to:
      determine a video shooting mode of the electronic device to a first mode, based on a result of measuring by the illuminance sensor, and
      in response to the video shooting mode being the first mode, fix the OIS driver at a position that is biased away from the center of the OIS driving range in the first direction.

10. The electronic device of claim 9, wherein the at least one processor is configured to determine the video shooting mode to the first mode when the ambient illuminance of the electronic device is greater than or equal to a threshold value.

11. The electronic device of claim 9, wherein, in response to the video shooting mode of the electronic device being a second mode, the at least one processor is configured to control the camera module to shift the OIS driver within the OIS driving range.

12. The electronic device of claim 1,
   wherein the OIS driver comprises an image sensor, and
   wherein the OIS driving range corresponds to a range within which the image sensor is shiftable.

13. An operating method of an electronic device, the operating method comprising:
   controlling a camera module included in the electronic device to fix an OIS driver in the camera module at a position that is biased away from a center of an OIS driving range in a first direction while the OIS driver is operating;
   obtaining image frames through the camera module while fixing the OIS driver; and
   obtaining a moving image by performing at least one of VDIS or EIS with respect to the image frames.

14. The method of claim 13, further comprising:
   identifying a direction of gravity exerted to the electronic device through a sensor which is configured to detect a movement of the electronic device; and
   determining the first direction based on the direction of gravity.

15. The method of claim 13, comprising:
   determining a video shooting mode; and
   in response to the video shooting mode being determined to a first mode, controlling the camera module to fix the OIS driver at a position that is biased away from the center of the OIS driving range in the first direction.

16. The method of claim 14, wherein the first direction is at an angle 45 degrees from the direction of gravity.

* * * * *